United States Patent
Varipatis et al.

(10) Patent No.: US 12,062,806 B2
(45) Date of Patent: *Aug. 13, 2024

(54) CORDLESS POWER TOOL SYSTEM COMPATIBLE WITH MULTIPLE BATTERY PACKS

(71) Applicant: BLACK & DECKER INC., New Britain, CT (US)

(72) Inventors: Michael Varipatis, Fallson, MD (US); Timothy J. Hennesy, Baltimore, MD (US); Craig Aaron Armacost, Parkton, MD (US)

(73) Assignee: BLACK & DECKER INC., New Britain, CT (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/646,815

(22) Filed: Jan. 3, 2022

(65) Prior Publication Data

US 2022/0209354 A1 Jun. 30, 2022

Related U.S. Application Data

(63) Continuation of application No. 17/249,730, filed on Mar. 10, 2021, now Pat. No. 11,217,856.
(Continued)

(51) Int. Cl.
*H02J 7/00* (2006.01)
*B25F 5/00* (2006.01)
(Continued)

(52) U.S. Cl.
CPC ............. *H01M 50/267* (2021.01); *B25F 5/00* (2013.01); *B25F 5/02* (2013.01); *H01M 50/247* (2021.01);
(Continued)

(58) Field of Classification Search
CPC ............. H01M 50/247; H01M 50/267; H01M 2220/30; B25F 5/00; B25F 5/02; H02J 7/0045
(Continued)

(56) References Cited

U.S. PATENT DOCUMENTS 7,497,275 B2 3/2009 Brotto
8,252,452 B2 8/2012 Yoon et al.
(Continued)

FOREIGN PATENT DOCUMENTS

EP 2892085 A2 7/2015
EP 3460866 A1 3/2019
(Continued)

OTHER PUBLICATIONS

International Search Report and Written Opinion for PCT Application No. PCT/US2021/070261, mailed on Jul. 2, 2021, 12 pages.
(Continued)

*Primary Examiner* — Zixuan Zhou
(74) *Attorney, Agent, or Firm* — Michael Aronoff

(57) ABSTRACT

A power tool system includes a power tool having a tool housing and a load disposed in the tool housing. The tool housing includes a battery pack receptacle having a set of tool terminals. The power tool system includes a set of battery packs. Each battery pack includes a battery pack housing operably connectable to the battery pack receptacle through a battery pack interface disposed on the battery pack housing, a set of battery cells disposed in the battery pack housing, and a set of battery pack terminals electrically connectable to the set of tool terminals and electrically connected to the set of battery cells. Each battery pack in the set of battery packs has a same nominal voltage and defines
(Continued)

a common interface and at least a portion of the set of battery packs defines a total volume in a range of approximately 150 cm³ to 1300 cm³.

28 Claims, 19 Drawing Sheets

Related U.S. Application Data

(60) Provisional application No. 62/987,647, filed on Mar. 10, 2020.

(51) Int. Cl.
  *B25F 5/02* (2006.01)
  *H01M 50/247* (2021.01)
  *H01M 50/267* (2021.01)

(52) U.S. Cl.
  CPC ....... *H02J 7/0045* (2013.01); *H01M 2220/30* (2013.01)

(58) Field of Classification Search
  USPC .......................................................... 320/112
  See application file for complete search history.

(56) References Cited

U.S. PATENT DOCUMENTS

| | | | |
|---|---|---|---|
| 8,426,057 B2 | 4/2013 | Park et al. | |
| 9,537,173 B2 | 1/2017 | Kim et al. | |
| 9,899,708 B2 | 2/2018 | Kim et al. | |
| 10,056,582 B2 | 8/2018 | White et al. | |
| 10,381,605 B2 | 8/2019 | Fauteux et al. | |
| 10,734,617 B2 | 8/2020 | Sakai et al. | |
| 2012/0104991 A1 | 5/2012 | Suzuki et al. | |
| 2016/0141728 A1 | 5/2016 | Fauteux et al. | |
| 2017/0331083 A1* | 11/2017 | Koenig | H01M 50/267 |
| 2019/0259984 A1 | 8/2019 | Nishikawa et al. | |
| 2019/0287736 A1* | 9/2019 | Yan | H01G 11/32 |
| 2019/0363332 A1 | 11/2019 | Fauteux et al. | |
| 2020/0358053 A1 | 11/2020 | Sauerteig et al. | |
| 2020/0358054 A1 | 11/2020 | Sauerteig et al. | |
| 2020/0358055 A1 | 11/2020 | Sauerteig et al. | |
| 2020/0358060 A1 | 11/2020 | Sauerteig et al. | |
| 2020/0358145 A1 | 11/2020 | Sauerteig et al. | |
| 2020/0388892 A1 | 12/2020 | Kim | |
| 2021/0143498 A1 | 5/2021 | Lee et al. | |
| 2021/0143517 A1 | 5/2021 | Lepiorz et al. | |

FOREIGN PATENT DOCUMENTS

| | | |
|---|---|---|
| EP | 3499600 A1 | 6/2019 |
| EP | 3588607 A1 | 1/2020 |
| EP | 3588614 A1 | 1/2020 |
| EP | 3591730 A1 | 1/2020 |
| EP | 3591739 A1 | 1/2020 |
| EP | 3664179 A1 | 6/2020 |
| EP | 3823081 A1 | 5/2021 |
| GB | 2386746 A | 9/2003 |
| WO | 2018119256 A1 | 6/2018 |
| WO | 2019120806 A1 | 6/2019 |
| WO | 2020007641 A1 | 1/2020 |

OTHER PUBLICATIONS

Lee, Sang C., et al., "Analogical understanding of the Ragone plot and a new categorization of energy devices", Energy Procedia, 88, (2016) pp. 526-530.

Wikipedia , "Lithium Ion Battery", downloaded from http://cleanenergywiki.org/index.php?title=Lithium_Ion_Battery, Oct. 8, 2019, 3 pages.

U.S. Appl. No. 17/249,730, filed Mar. 10, 2021.

* cited by examiner

| | rated cell current (A) | max cell current (A) | voltage @ max cell current (V) | nominal cell voltage (V) | nominal pack voltage (V) |
|---|---|---|---|---|---|
| 110a | 30 | 257.8 | 1.3 | 3.6 | 18 |
| 110aa | | | | | |
| 110ab | | | | | |
| 110ac | | | | | |
| 110ad | | | | | |
| 110ae | | | | | |
| 110b | 30 | 257.8 | 1.3 | 3.6 | 18 |
| 110ba | | | | | |
| 110bb | | | | | |
| 110bc | | | | | |
| 110bd | | | | | |
| 110be | | | | | |
| 110c | 35 | 298 | 1.5 | 3.6 | 18 |
| 110ca | | | | | |
| 110cb | | | | | |
| 110cc | | | | | |
| 110cd | | | | | |
| 110ce | | | | | |
| 110d | 30 | 361.67 | 1.8 | 3.6 | 18 |
| 110da | | | | | |
| 110db | | | | | |
| 110dc | | | | | |
| 110dd | | | | | |
| 110de | | | | | |

FROM FIG. 12A

| Power-cell (W) | number of cells/string | number of strings in parallel per block | number of blocks in series | Power-pack (W) | Peak Power-cell (W) | Peak-Power-pack (W) |
|---|---|---|---|---|---|---|
| 108 | 5 | 1 | 1 | 540 | 335.14 | 1675.7 |
|  |  |  |  |  |  |  |
|  |  |  |  |  |  |  |
|  |  |  |  |  |  |  |
|  |  |  |  |  |  |  |
|  |  |  |  |  |  |  |
| 108 | 5 | 1 | 1 | 540 | 335.14 | 1675.7 |
|  |  |  |  |  |  |  |
|  |  |  |  |  |  |  |
|  |  |  |  |  |  |  |
|  |  |  |  |  |  |  |
|  |  |  |  |  |  |  |
| 126 | 5 | 1 | 3 | 1890 | 447.00 | 6705 |
|  |  |  |  |  |  |  |
|  |  |  |  |  |  |  |
|  |  |  |  |  |  |  |
|  |  |  |  |  |  |  |
|  |  |  |  |  |  |  |
| 108 | 5 | 2 | 3 | 3240 | 651.01 | 9765.09 |
|  |  |  |  |  |  |  |
|  |  |  |  |  |  |  |
|  |  |  |  |  |  |  |
|  |  |  |  |  |  |  |

| Volume Type | Volume (cm³) | power density-pack (W/cm³) | peak power density-pack (W/cm³) |
|---|---|---|---|
| Total Volume | 287 | 1.88 | 5.84 |
| Interior Volume | 210 | 2.57 | 7.98 |
| Tool Foot Exterior | 258 | 2.09 | 6.49 |
| Tool Foot Interior | 185 | 2.92 | 9.06 |
| Cavity of Cells | 151 | 3.58 | 11.10 |
| Cells Alone | 82.7 | 6.53 | 20.26 |
| Total Volume | 278 | 1.94 | 6.03 |
| Interior Volume | 203 | 2.66 | 8.25 |
| Tool Foot Exterior | 249 | 2.17 | 139.64 |
| Tool Foot Interior | 179 | 3.02 | 9.36 |
| Cavity of Cells | 144 | 3.75 | 11.64 |
| Cells Alone | 82.7 | 6.53 | 20.26 |
| Total Volume | 860 | 2.20 | 7.80 |
| Interior Volume | 644 | 2.93 | 10.41 |
| Tool Foot Exterior | 831 | 2.27 | 8.07 |
| Tool Foot Interior | 624 | 3.03 | 10.75 |
| Cavity of Cells | 514 | 3.68 | 13.04 |
| Cells Alone | 363.7 | 5.2 | 18.44 |
| Total Volume | 1272 | 2.55 | 7.68 |
| Interior Volume | 1006 | 3.22 | 9.71 |
| Tool Foot Exterior | 1243 | 2.61 | 7.86 |
| Tool Foot Interior | 985 | 3.29 | 9.91 |
| Cavity of Cells | 874 | 3.71 | 11.17 |
| Cells Alone | 496.2 | 6.53 | 19.68 |

FROM FIG. 12B

FROM
FIG. 12A

| | | | | | |
|---|---|---|---|---|---|
| 110e | 40 | 302 | 1.5 | 3.6 | 18 |
| 110ea | | | | | |
| 110eb | | | | | |
| 110ec | | | | | |
| 110ed | | | | | |
| 110ee | | | | | |
| | | | | | |
| 110f | 40 | 302 | 1.5 | 3.6 | 18 |
| 110fa | | | | | |
| 110fb | | | | | |
| 110fc | | | | | |
| 110fd | | | | | |
| 110fe | | | | | |
| | | | | | |
| 110g | 30 | 257.8 | 1.3 | 3.6 | 18 |
| 110ga | | | | | |
| 110gb | | | | | |
| 110gc | | | | | |
| 110gd | | | | | |
| 110ge | | | | | |
| | | | | | |
| 110h | 20 | 188 | 0.95 | 3.6 | 18 |
| 110ha | | | | | |
| 110hb | | | | | |
| 110hc | | | | | |
| 110hd | | | | | |
| 110he | | | | | |
| | | | | | |

| | | | | | | |
|---|---|---|---|---|---|---|
| 144 | 5 | 1 | 1 | 720 | 453.00 | 2265 |
| | | | | | | |
| | | | | | | |
| | | | | | | |
| | | | | | | |
| | | | | | | |
| | | | | | | |
| 144 | 5 | 1 | 1 | 720 | 453.00 | 2265 |
| | | | | | | |
| | | | | | | |
| | | | | | | |
| | | | | | | |
| | | | | | | |
| 108 | 5 | 1 | 1 | 540 | 335.14 | 1675.7 |
| | | | | | | |
| | | | | | | |
| | | | | | | |
| | | | | | | |
| | | | | | | |
| | | | | | | |
| 72 | 5 | 1 | 1 | 360 | 178.60 | 893 |
| | | | | | | |
| | | | | | | |
| | | | | | | |
| | | | | | | |
| | | | | | | |

FIG. 12E

FROM
FIG. 12C

|  | | 228 | 3.16 | 9.93 |
|---|---|---|---|---|
| Total Volume | | 228 | 3.16 | 9.93 |
| Interior Volume | | 162 | 4.44 | 13.98 |
| Tool Foot Exterior | | 199.5 | 3.61 | 11.35 |
| Tool Foot Interior | | 136 | 5.29 | 16.65 |
| Cavity of Cells | | 92.7 | 20.57 | 24.43 |
| Cells Alone | | 60 | 20.00 | 37.75 |
| Total Volume | | 212 | 3.40 | 10.68 |
| Interior Volume | | 148 | 4.86 | 15.30 |
| Tool Foot Exterior | | 183 | 3.93 | 12.38 |
| Tool Foot Interior | | 123 | 5.85 | 18.41 |
| Cavity of Cells | | 82.6 | 8.72 | 27.42 |
| Cells Alone | | 60 | 12.00 | 37.75 |
| Total Volume | | 255 | 2.12 | 6.57 |
| Interior Volume | | 195 | 2.77 | 8.59 |
| Tool Foot Exterior | | 226 | 2.39 | 7.41 |
| Tool Foot Interior | | 173 | 3.12 | 9.69 |
| Cavity of Cells | | 113 | 4.78 | 14.83 |
| Cells Alone | | 82.7 | 6.53 | 20.26 |
| Total Volume | | 150 | 2.40 | 5.95 |
| Interior Volume | | 123 | 2.93 | 7.26 |
| Tool Foot Exterior | | 122 | 2.95 | 7.32 |
| Tool Foot Interior | | 101 | 3.56 | 8.84 |
| Cavity of Cells | | 79.9 | 4.51 | 11.18 |
| Cells Alone | | 50 | 7.20 | 17.86 |

FROM
FIG. 12E

FIG. 12F

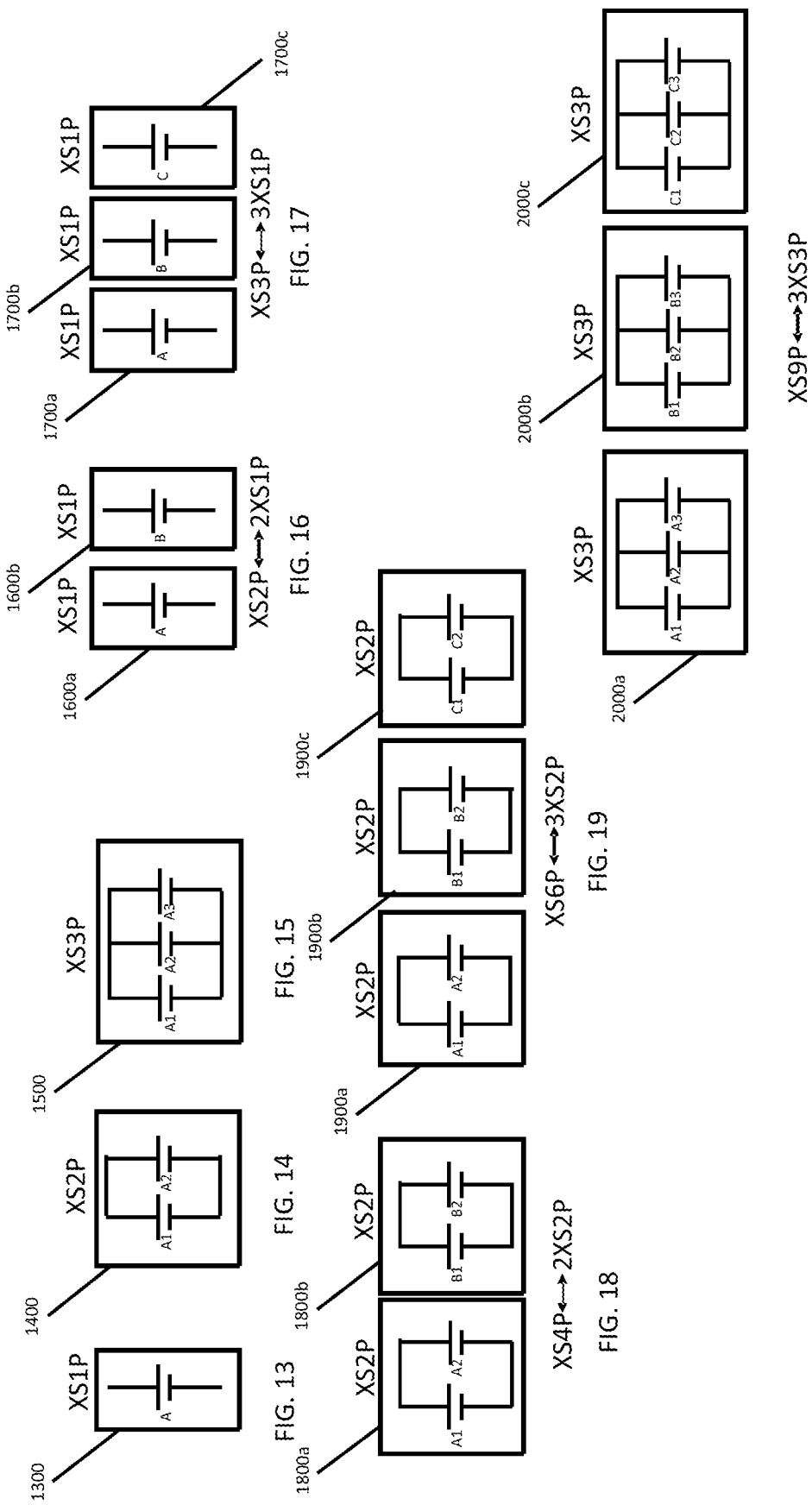

CORDLESS POWER TOOL SYSTEM COMPATIBLE WITH MULTIPLE BATTERY PACKS

CROSS REFERENCE TO RELATED APPLICATIONS

This application is a continuation application of U.S. application Ser. No. 17/249,730, filed Mar. 10, 2021, and titled "Cordless Power Tool System Compatible With Multiple Battery Packs," which claims priority to and the benefit of U.S. Provisional Application No. 62/987,647, filed Mar. 10, 2020, and titled "Cordless Power Tool System Compatible With Multiple Battery Packs," both of which are incorporated by reference herein in their entireties.

TECHNICAL FIELD

This description relates to a cordless power tool system that is compatible with multiple battery packs.

BACKGROUND

Various types of electric power tools are commonly used in construction, home improvement, outdoor, and do-it-yourself projects. Electric power tools generally fall into two categories—AC (alternating current) power tools (often also called corded power tools) that can operate using one or more AC power supplies (such as AC mains or a generator) and DC (direct current) power tools (often also called cordless power tools) that can operate using one or more DC power supplies (such as one or more removable and rechargeable battery packs).

Cordless or DC power tools have typically been used for lighter duty applications, such as light duty sawing, light duty drilling, fastening, that require lower power and/or require shorter time to complete the task, as compared to relatively heavy duty applications that have typically been completed by corded electric power tools or some non-electric power tools such as gasoline powered, pneumatic powered or hydraulic powered tools. Cordless power tool users have expressed a desire to utilize cordless power tools that are powered by common battery platforms that have a volumetric range of battery sizes that can handle not only lighter duty applications but also heavier duty applications.

It is desirable to provide a technical solution that meets the desire of cordless power tool users for cordless power tools that are compatible with a common battery platform having a wider volumetric range of battery sizes.

SUMMARY

In one general aspect, a power tool system includes a power tool. The power tool includes a tool housing and a load disposed in the tool housing. The tool housing includes a battery pack receptacle and the battery pack receptacle includes a set of tool terminals. The power tool system includes a first battery pack. The first battery pack includes a first battery pack housing operably connectable to the battery pack receptacle on the tool housing through a first battery pack interface disposed on the first battery pack housing, a first set of battery cells disposed in the first battery pack housing, and a first set of battery pack terminals electrically connectable to the set of tool terminals and electrically connected to the first set of battery cells. The power tool system includes a second battery pack. The second battery pack includes a second battery pack housing operably connectable to the battery pack receptacle on the tool housing through a second battery pack interface disposed on the second battery pack housing, a second set of battery cells disposed in the second battery pack housing, and a second set of battery pack terminals electrically connectable to the set of tool terminals and electrically connected to the second set of battery cells. The first battery pack and the second battery pack have a same nominal voltage. The first battery pack interface and the second battery pack interface define a common interface. The first battery pack defines a total volume in a range of approximately 150 $cm^3$ to 860 $cm^3$ and the second battery pack defines a total volume greater than approximately 980 $cm^3$.

Implementations includes one or more of the following features. For example, the second battery pack may define a total volume greater than or equal to approximately 1272 $cm^3$. In some implementations, the first battery pack may define a peak volumetric power density in terms of Watts (W) per volume (e.g., $cm^3$ or mL) in a range of approximately 6.0 $W/cm^3$ to approximately 7.8 $W/cm^3$. The second battery pack may define a peak power density greater than or equal to approximately 7.8 $W/cm^3$.

In some implementations, the first set of battery cells may include 21700-sized battery cells and the second set of battery cells may include 21700-sized battery cells.

In some implementations, the first set of battery cells may include 18650-sized battery cells and the second set of battery cells may include 18650-sized battery cells.

In some implementations, the first set of battery cells may include 18650-sized battery cells and the second set of battery cells may include 21700-sized battery cells.

In some implementations, the first set of battery cells may include 21700-sized battery cells and the second set of battery cells may include 18650-sized battery cells.

In some implementations, the first set of battery cells may include pouch-type battery cells.

In some implementations, the load may include a motor disposed in the tool housing, and the power tool may further include a controller disposed in the tool housing. The motor includes an output shaft that is operably coupled to drive a tool element. The controller is operably connected to the set of tool terminals and to the motor to control power delivery to the motor.

In some implementations, the first battery pack and the second battery pack have the same nominal voltage of approximately 18 V.

In another general aspect, a power tool system includes a power tool. The power tool includes a tool housing and a load disposed in the tool housing. The tool housing includes a battery pack receptacle and the battery pack receptacle including a set of tool terminals. The power tool system includes a first battery pack. The first battery pack includes a first battery pack housing operably connectable to the battery pack receptacle on the tool housing through a first battery pack interface disposed on the first battery pack housing, a first set of battery cells disposed in the first battery pack housing, and a first set of battery pack terminals electrically connectable to the set of tool terminals and electrically connected to the first set of battery cells. The power tool system includes a second battery pack. The second battery pack includes a second battery pack housing operably connectable to the battery pack receptacle on the tool housing through a second battery pack interface disposed on the second battery pack housing, a second set of battery cells disposed in the second battery pack housing, and a second set of battery pack terminals electrically connectable to the set of tool terminals and electrically connected to the second set of battery cells. The first battery pack and the second battery pack have a same nominal voltage. The first battery pack interface and the second battery pack interface define a common interface. The first battery pack defines a peak power density in a range of approximately 6.0 W/cm$^3$ to approximately 7.8 W/cm$^3$ and the second battery pack defines a peak power density greater than or equal approximately 7.8 W/cm$^3$.

Implementations include one or more of the following features. For example, the first battery pack may define a total volume in a range of approximately 150 cm$^3$ to approximately 860 cm$^3$. The second battery pack may define a total volume greater than approximately 980 cm$^3$. The second battery pack may define a total volume greater than approximately 1272 cm$^3$.

In some implementations, the first set of battery cells may include 21700-sized battery cells and the second set of battery cells may include 21700-sized battery cells.

In some implementations, the first set of battery cells may include 18650-sized battery cells and the second set of battery cells may include 18650-sized battery cells.

In some implementations, the first set of battery cells may include 18650-sized battery cells and the second set of battery cells may include 21700-sized battery cells.

In some implementations, the first set of battery cells may include 21700-sized battery cells and the second set of battery cells may include 18650-sized battery cells.

In some implementations, the first set of battery cells may include pouch-type battery cells.

In some implementations, the load may include a motor disposed in the tool housing, and the power tool may further include a controller disposed in the tool housing. The motor includes an output shaft that is operably coupled to drive a tool element. The controller is operably connected to the set of tool terminals and to the motor to control power delivery to the motor.

In some implementations, the first battery pack and the second battery pack have the same nominal voltage of approximately 18 V.

In another general aspect, a power tool system includes a power tool. The power tool includes a tool housing and a load disposed in the tool housing. The tool housing includes a battery pack receptacle. The battery pack receptacle includes a set of tool terminals. The power tool system includes a set of battery packs. Each battery pack in the set of battery packs includes a battery pack housing operably connectable to the battery pack receptacle on the tool housing through a battery pack interface disposed on the battery pack housing, a set of battery cells disposed in the battery pack housing, and a set of battery pack terminals electrically connectable to the set of tool terminals and electrically connected to the set of battery cells. Each battery pack in the set of battery packs has a same nominal voltage. Each battery pack in the set of battery packs defines a common interface. At least a first subset of the set of battery packs defines a total volume in a range of approximately 150 cm$^3$ to approximately 860 cm$^3$.

Implementations may include one or more of the following features. For example, at least a second subset of the set of battery packs may define a total volume greater than approximately 980 cm$^3$. The first subset of the set of battery packs may define a peak power density in a range of approximately 6.0 W/cm$^3$ to approximately 7.8 W/cm$^3$. The second subset of the set of battery packs may define a peak power density greater than or equal to approximately 7.8 W/cm$^3$.

In some implementations, the load may include a motor disposed in the tool housing, and the power tool may further include a controller disposed in the tool housing. The motor includes an output shaft that is operably coupled to drive a tool element. The controller is operably connected to the set of tool terminals and to the motor to control power delivery to the motor.

In some implementations, the first battery pack and the second battery pack have the same nominal voltage of approximately 18 V.

The details of one or more implementations are set forth in the accompanying drawings and the description below. Other features will be apparent from the description and drawings, and from the claims.

BRIEF DESCRIPTION OF THE DRAWINGS

FIGS. 12A-12F illustrate an example table summarizing the example battery packs of FIGS. 1 and 3A-10E including the volumes, power densities, and peak power densities of the battery packs.

FIG. 13 illustrates an example configuration of a set of battery cells.

FIG. 14 illustrates another example configuration of a set of battery cells.

FIG. 15 illustrates another example configuration of a set of battery cells.

FIG. 16 illustrates another example configuration of a set of battery cells.

FIG. 17 illustrates another example configuration of a set of battery cells.

FIG. 18 illustrates another example configuration of a set of battery cells.

FIG. 19 illustrates another example configuration of a set of battery cells.

FIG. 20 illustrates another example configuration of a set of battery cells.

DETAILED DESCRIPTION

Figure 1:
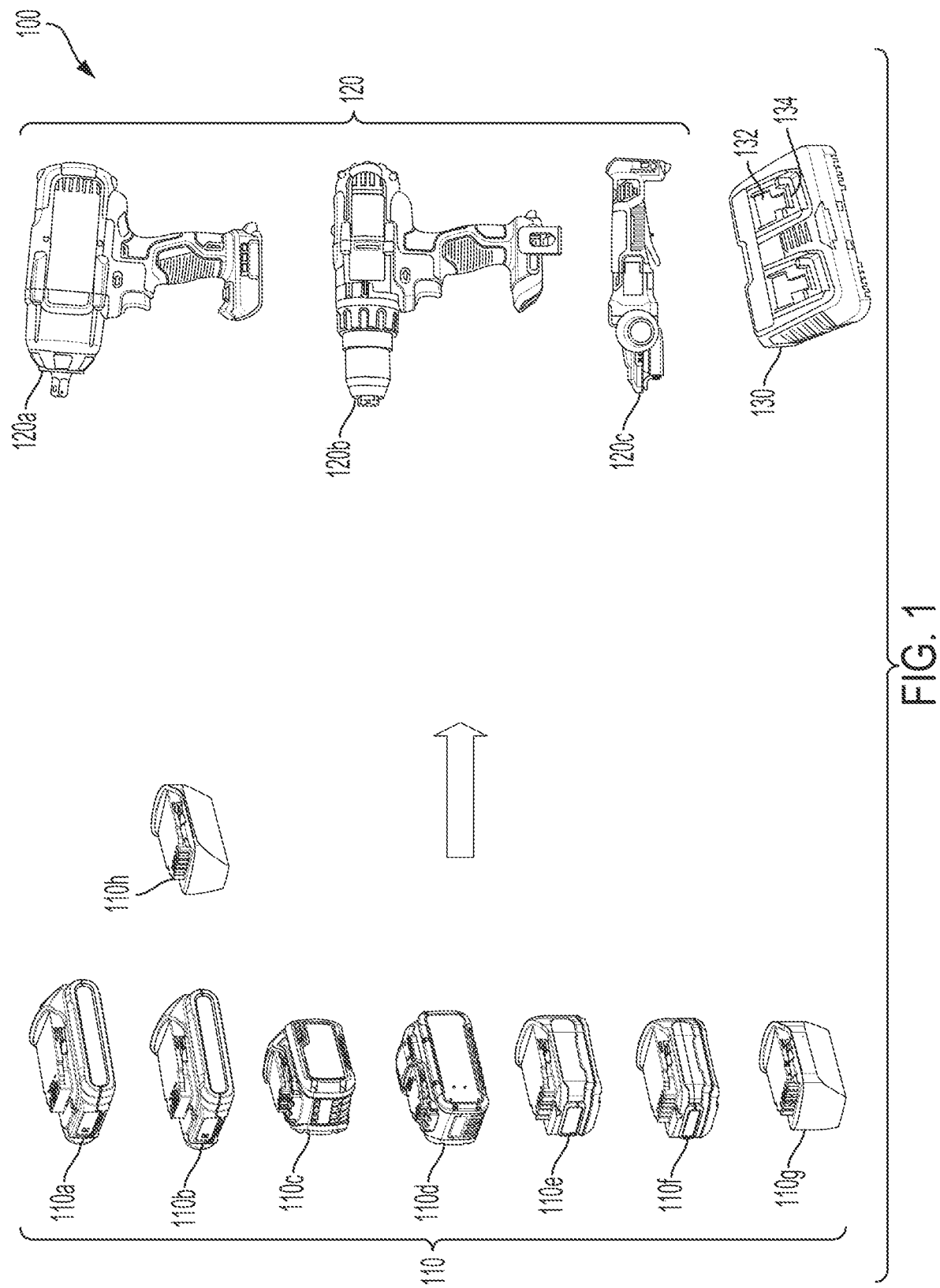
FIG. 1 illustrates a first example embodiment of a power tool system.

This document describes a power tool system that provides a technical solution to address the problems described above and that meets the desires of cordless power tool users. For example, the power tool system includes multiple battery packs having a same nominal voltage with different volumetric sizes that all share a common interface to couple/mate with one or more devices, such as cordless power tools and battery chargers. The multiple battery packs with the same nominal voltage but with different volumetric sizes and other characteristics provide users different solutions for use with the cordless power tools. For instance, a set of battery packs may have a nominal voltage of approximately 18 V and include a range of different volumetric sizes and other characteristics that provides different options for the user. For the set of battery packs having the nominal voltage of approximately 18 V, a user for a cordless power tool would have the option to use a battery pack with a smaller volumetric size with its lighter, more ergonomic design and also have the option to use a battery pack with a larger volumetric size with its longer run time, power, or other performance metrics. The variation in volumetric sizes and other characteristics for a set of battery packs with the same nominal voltage for use with one or more cordless power tools provides a solution to meet user needs and desires.

To enable the set of battery packs having the same nominal voltage but different volumetric sizes and other characteristics to work with a same cordless power tool, each of the battery packs in the set of battery packs have (or define) a common interface (also referred to as a "same interface") on the battery pack. As used herein, the common interface is the same structural feature on each battery pack in the set of battery packs that allows the battery packs to mate with or engage, both mechanically and electrically, to one or more devices, such as cordless power tools and/or to one or more battery pack chargers or charging stations. The common interface engages a common interface on the cordless power tool that is sized and configured to receive the common battery pack interface. For instance, in one example implementation, a set of battery packs having a same nominal voltage (e.g., 10.8 V, 18 V, etc.) but different volumetric sizes may all have a common interface such that each battery pack in the set of battery packs will mate with or engage a same cordless power tool. Said another way, the cordless power tool is capable of using all of the battery packs in the set of battery packs because the common interface on the battery packs is the same and is matched to the common interface on the cordless power tool even though the volumetric size is different for each battery pack.

As mentioned above, the set of battery packs having a same nominal voltage may differ in volumetric sizes. The volumetric size of a battery pack includes multiple different manners of expressing the volumetric size of the battery pack. One measure of expressing (or defining) the volumetric size of the battery pack is a total volume of the battery pack. As used herein, a total volume of the battery pack means the amount of three-dimensional (3D) space the entire battery pack takes up, including the common battery pack interface which is a part of the battery pack, as expressed in cubic units (e.g., cubic centimeters ($cm^3$)). The total volume of the battery pack may be measured in different manners including using a displacement method, which measures a volume of water displaced when an entire, sealed battery pack is submerged in water. Other measurement means also may be used.

As mentioned, a total volume of the battery pack is one manner of expressing the volumetric size of the battery pack. Other manners of expressing the volumetric size of the battery pack include an interior volume of the battery pack, a tool foot interior of the battery pack, a tool foot exterior of the battery pack, a cavity of the battery cells within the battery pack, and the battery cells alone that are used in the battery pack. Each of these other manners are defined and described in detail below with respect to the figures and descriptions below accompanying each of the illustrated battery packs.

In addition to the set of battery packs defined by different volumetric sizes, the set of battery characteristics also may be defined by other battery pack characteristics. One such other battery pack characteristic is power density. As used herein, the power density of a battery pack is the rate of energy flow (power) per unit volume expressed in Watts (W) per cubic unit (e.g., cubic centimeters ($cm^3$)). Power (W) is calculated based on a rated cell current of the battery cells used in the battery pack and an assumed average cell voltage. As used herein, the assumed average cell voltage is approximately 3.6 V per cell under this current load. As used herein, the rated cell current is the maximum continuous current whereby a single battery cell can achieve full discharge to undervoltage condition without reaching the battery cell manufacturer's recommended temperature limit. This power calculation in Watts (W) is then multiplied by the appropriate number of cells as determined by the battery pack configuration.

Another battery pack characteristic related to power density is peak power density. As used herein, the peak power density of a battery pack is the rate of peak energy flow (power) per unit volume. Peak power per cell is derived by multiplying the measured maximum, momentary—or instantaneous—current of the specified battery cells used in the battery pack at full charge and room temperature under a short circuit load of approximately 5 milliOhm and the measured voltage of the battery cell at the time of measuring the maximum momentary current. This power calculation in Watts (W) is then multiplied by the appropriate number of cells as determined by the battery pack configuration to determine the peak power of the battery pack. The peak power of the battery pack is then divided by the volume of the battery pack to calculate the peak power density, as expressed in Watts (W) per cubic unit (e.g., cubic centimeters ($cm^3$)).

Each of the power tools and battery packs discussed in this patent application may be said to have a rated voltage. As used in this application, rated voltage may refer to an advertised voltage. The advertised/rated voltage may encompass a single voltage, several discrete voltages, or one or more ranges of voltages. As used in the application, rated voltage may refer to any of these types of voltages or a range of any of these types of voltages.

With respect to power tools and battery packs, the advertised voltage generally refers to a voltage that is designated on labels, packaging, user manuals, instructions, advertising, marketing, or other supporting documents for these products by a manufacturer or seller so that a user is informed which power tools and battery packs will operate with one another. The advertised voltage may include a numeric voltage value, or another word, phrase, alphanumeric character combination, icon, or logo that indicates to the user which power tools and battery packs will work with one another. In some embodiments, as discussed below, a power tool and a battery pack may have a single advertised voltage (e.g., 20V, 18V), a range of advertised voltages (e.g., 20V-60V), a plurality of discrete advertised voltages (e.g., 20V/60V), or an alphanumeric designation (e.g., 20V MAX, M18).

For a battery cell, the operating voltage generally refers to a voltage range the battery cell manufacturer suggest to operate the battery cell for safety and reliability purposes (e.g., for Li-ion battery cells using an open circuit, i.e., unloaded, the operating voltage range may be 2.75 volts to 4.2 volts per cell). For a battery pack, the operating voltage generally refers to the DC voltage range at which the battery pack is designed by the battery pack manufacturer to operate (also sometimes referred to as controlled voltage) for safety and reliability purposes. For example, a battery pack having Li-ion battery cells advertised as a 20V battery pack may have an operating voltage range of 13.75 V to 20.5 V. Also, a battery pack having Li-ion battery cells advertised as a 20V battery pack, with an operating voltage of 13.75 V to 20.5 V, may have a nominal voltage of approximately 18 V.

For a battery cell, nominal voltage generally refers to the voltage of the battery cell at fifty percent (50%) of its state of charge (SOC). For a Li-ion battery cell, this is between approximately 3.6 V and about 3.7 V. For a battery pack, nominal voltage generally refers to the voltage of the battery pack at fifty percent (50%) of its SOC. Of course, for a battery pack, the nominal voltage will depend upon the number of cells electrically connected in series to each other.

The amount of charge stored in a battery cell or the capacity of a battery cell or the battery cell capacity may be measured in Ampere Hours or Amp Hours (AHr). A battery cell may have, for example, a capacity of 1 AHr. This indicates that the battery cell will be able to continuously provide a current of 1 Amp for 1 hour. As is well known, while connecting a set of battery cells in series does alter the voltage of the connected set of cells, it does not alter the capacity of the connected set of cells. As is also well known, while connecting a set of battery cells in parallel does not alter the voltage of the connected set of cells, it does alter the capacity of the connected set of cells. For example, two battery cells, each having a nominal voltage of 3.6 V and a capacity of 1 AHr, when connected in series will have a combined voltage of 7.2 V and a combined capacity of 1 AHr and when connected in parallel will have a combined voltage of 3.6 V and a combined capacity of 2 AHr.

The power tools and battery packs may have ratings for features other than voltage. For example, the power tools may have ratings for motor performance, such as an output power (e.g., maximum watts out (MWO) as described in U.S. Pat. No. 7,497,275, which is incorporated by reference) or motor speed under a given load condition.

This application may also refer to the ratings for voltage (and other features) using relative terms such as low, medium, high, and very high. The terms low rated, medium rated, high rated, and very high rated are relative terms used to indicate relative relationships between the various ratings of the power tools and battery packs, and components thereof, and are not intended to be limited to any particular numerical values or ranges. For example, it should be understood that a low rated voltage is generally lower than a medium rated voltage, a medium rated voltage is generally lower than a high rated voltage, and a high rated voltage is generally lower than a very high rated voltage. In one particular implementation, the different rated voltages may be whole number multiples or factors of each other. For example, the medium rated voltage may be a whole number multiple of the low rated voltage, and the high rated voltage may be a whole number multiple of the medium rated voltage. For example, the low rated voltage may be 20 V, the medium rated voltage may be 60 V, and the high rated voltage may be 120 V.

A string of battery cells—battery cells simply referred to hereinafter as cells—is a set of cells connected in series. For example, FIG. 13 illustrates a string or set of cells A. The set of cells may include one or more cells connected in series.

In another example, FIG. 14 illustrates two strings or sets of cells A1 and A2 connected in parallel. In another example, FIG. 15 illustrates three strings or sets of cells A1, A2, and A3 connected in parallel. FIGS. 13, 14, and 15 illustrate a configuration including a block of cells. Specifically, FIG. 13 illustrates a block of cells 1300, FIG. 14 illustrates a block of cells 1400, and FIG. 15 illustrates a block of cells 1500. One way to describe these cell configurations—and by extension a battery pack including these cells configurations—is by the number of cells of the string or set connected in series (X), the number of strings or sets of cells connected in parallel (Y), and the number of blocks of cells (Z). In other words, in fixed voltage battery packs the cells—or the packs themselves—can be referred to as XSYZP where S stands for series and P stands for parallel.

As such, the cells of FIG. 13 may be described as XS1P and the cells of FIG. 14 may be described as XS2P and the cells of FIG. 15 may be described as XS3P. The X will be replaced by the number of cells in a string. For example, if the string A of FIG. 13 includes 5 cells connected in series, the cell configuration may be referred to as 5S1P. And, with regard to FIG. 14, if the string A1 includes 5 cells connected in series and the string A2 includes 5 cells connected in series, the cell configuration may be referred to as 5S2P. And, with regard to FIG. 15, if the string A1 includes 5 cells connected in series, the string A2 includes 5 cells connected in series, and the string A3 includes 5 cells connected in series, the cell configuration may be referred to as 5S3P.

FIGS. 13-15 illustrate fixed voltage battery packs that are only capable of producing or providing a single output voltage. There also exist multi-voltage battery packs that are capable of producing or providing two output voltages. In multi-voltage battery packs there is at least a first block of battery cells and a second block of battery cells. It can be said that fixed voltage battery packs include only a single block of cells.

FIG. 16 illustrates an example of a set of cells of a multi-voltage battery pack. There is a first block of cells 1600a and a second block of cells 1600b. The battery pack is capable of coupling the blocks of cells 1600a and 1600b in series or in parallel. Similar to the fixed voltage battery packs, multi-voltage battery packs can be described using the nomenclature noted above. However, different than fixed voltage battery packs, multi-voltage battery packs, having two different configurations, require a definition for each configuration. When in the low voltage configuration, the definition for the configuration is the same as for fixed voltage battery packs. However, when the multi-voltage battery packs are in the high voltage configuration, the configuration is defined as XZSYP.

For example, FIG. 16 illustrates a first block of cells 1600a having a single string of cells (A) and a second block of cells 1600a having a single string of cells (B). The first block of cells 1600a includes a XS1P configuration and the second block of cells 1600b includes an XS1P configuration. As such, when the first block of cells 1600a and the second block of cells 1600b are coupled together in parallel, the blocks of cells present an XS2P configuration and when the first block of cells 1600a and the second block of cells 1600b are coupled together in series, the blocks of cells present a 2XS1P configuration. The X will be replaced by the number of cells in a string. For example, with regard to FIG. 16, if the string A includes 5 cells connected in series and the string B includes 5 cells connected in series, the cell configuration may be referred to as 5S2P when the blocks are connected in parallel and the cell configuration may be referred to as 10S1P when the blocks are connected in series.

In another example, FIG. 17 illustrates a first block of cells 1700a having a single string of cells (A), a second block of cells 1700b having a single string of cells (B), and a third block of cells 1700c having a single string of cells (C). The first block of cells 1700a includes a XS1P configuration, the second block of cells 1700b includes an XS1P configuration, and the third block of cells 1700c includes an XS1P configuration. As such, when the first block of cells 1700a, the second block of cells 1700b, and the third block of cells 1700c are coupled together in parallel, the blocks of cells present an XS3P configuration and when the first block of cells 1700a, the second block of cells 1700b, and the third block of cells 1700c are coupled together in series, the blocks of cells present a 3XS1P configuration. The X will be replaced by the number of cells in a string. With regard to FIG. 17, if the string A includes 5 cells connected in series, the string B includes 5 cells connected in series, and the string C includes 5 cells connected in series, the cell configuration may be referred to as 5S3P when the blocks are connected in parallel and the cell configuration may be referred to as 15S1P when the blocks are connected in series.

In another example battery pack, FIG. 18 illustrates another multi-voltage battery pack. There is a first block of cells 1800a having a first string of cells (A1) and a second string of cells (A2) and a second block of cells 1800b having a first string of cells (B1) and a second string of cells (B2). The first block of cells 1800a includes an XS2P configuration and the second block of cells 1800b includes an XS2P configuration. As such, when the first block of cells 1800a and the second block of cells 1800b are coupled together in parallel, the blocks of cells present an XS4P configuration and when the first block of cells 1800a and the second block of cells 1800b are coupled together in series, the blocks of cells present a 2XS2P configuration. The X will be replaced by the number of cells in a string. For example, with regard to FIG. 18, if the strings A1 and A2 each include 5 cells connected in series and the strings B1 and B2 each include 5 cells connected in series, the cell configuration may be referred to as 5S4P when the blocks are connected in parallel and the cell configuration may be referred to as 10S2P when the blocks are connected in series.

In another example battery pack, FIG. 19 illustrates a first block of cells 1900a having a first string of cells (A1) and a second string of cells (A2) coupled in parallel, a second block of cells 1900b having a first string of cells (B1) and a second string of cells (B2) coupled in parallel, and a third block of cells 1900c having a first string of cells (C1) and a second string of cells (C2) coupled together in parallel. The first block of cells 1900a includes an XS2P configuration, the second block of cells 1900b includes an XS2P configuration, and the third block of cells 1900c includes an XS2P configuration. As such, when the first block of cells 1900a, the second block of cells 1900b, and the third block of cells 1900c are coupled together in parallel, the blocks of cells present an XS6P configuration and when the first block of cells 1900a, the second block of cells 1900b, and the third block of cells 1900c are coupled together in series, the blocks of cells present a 3XS2P configuration. The X will be replaced by the number of cells in a string. With regard to FIG. 19, if the strings A1 and A2 each include 5 cells connected in series, the strings B1 and B2 each include 5 cells connected in series, and the strings C1 and C2 each include 5 cells connected in series, the cell configuration may be referred to as 5S6P when the blocks are connected in parallel and the cell configuration may be referred to as 15S2P when the blocks are connected in series.

In another example battery pack, FIG. 20 illustrates a first block of cells 2000a having a first string of cells (A1), a second string of cells (A2), and a third string of cells (A3) coupled in parallel, a second block of cells 2000b having a first string of cells (B1), a second string of cells (B2), and a third string of cells (B3) coupled in parallel, and a third block of cells 2000c having a first string of cells (C1), a second string of cells (C2), and third string of cells (C3) coupled together in parallel. The first block of cells 2000a includes an XS3P configuration, the second block of cells 2000b includes an XS3P configuration, and the third block of cells 2000c includes an XS3P configuration. As such, when the first block of cells 2000a, the second block of cells 2000b, and the third block of cells 2000c are coupled together in parallel, the blocks of cells present an XS9P configuration and when the first block of cells 2000a, the second block of cells, 2000b and the third block of cells 2000c are coupled together in series, the blocks of cells present a 3XS3P configuration. The X will be replaced by the number of cells in a string. For example, with regard to FIG. 20, if the strings A1, A2, and A3 each include 5 cells connected in series, the strings B1, B2, and B3 each include 5 cells connected in series, and the strings C1, C2, and C3 each include 5 cells connected in series, the cell configuration may be referred to as 5S9P when the blocks are connected in parallel and the cell configuration may be referred to as 15S3P when the blocks are connected in series.

The following definitions may be considered. For purposes of determining power density—as described throughout this specification and set forth in the table of FIGS. 12A-12F, consider the following. The power of a battery cell—expressed in Watts—is equal to the rated current of the cell—expressed in Amperes—multiplied by the nominal voltage of the cell—expressed in Volts.

$$\text{power}_{cell} \text{ (W)} = \text{rated current}_{cell} \text{ (A)} \times \text{nominal voltage}_{cell} \text{ (V)} \quad \text{Eq. 1}$$

The power of a battery pack—expressed in Watts—is equal to the power of a battery cell multiplied by the number of battery cells in a series-coupled string of battery cells multiplied by the number of strings in parallel per block of cells multiplied by the number of blocks of cells coupled in series.

$$\text{power}_{pack} \text{ (W)} = \text{power}_{cell} \text{ (W)} \times (\text{number of cells/string}) \times (\text{number of strings in parallel/block}) \times (\text{number of blocks in series}) \quad \text{Eq. 2}$$

Power Density of a battery pack is equal to the power of the pack—expressed in Watts—divided by a volume—expressed in $cm^3$.

$$\text{power density}_{pack} = \text{power}_{pack} \text{ (W)}/\text{volume (cm}^3\text{)} \quad \text{Eq. 3}$$

The rated cell is the maximum continuous current whereby the cell can achieve approximately full discharge to an undervoltage condition without reaching the cell manufacturer's recommended temperature limit.

For multi-voltage battery packs, the calculations—from the equations above and set forth in the table of FIGS. 12A-12F—were taken with the battery pack in its high voltage condition. In other words, the blocks were coupled in series.

For purposes of determining peak power density—as described throughout this specification and set forth in the table of FIGS. 12A-12F, consider the following. The peak power of a battery cell—expressed in Watts—is equal to the maximum current of the battery cell—expressed in Amperes—multiplied by the voltage of the battery cell at the maximum current of the battery cell—expressed in Volts.

$$\text{peak power}_{cell} \text{ (W)} = \text{maximum current}_{cell} \text{ (A)} \times \text{voltage at maximum current}_{cell} \text{ (V)} \qquad \text{Eq. 4}$$

The peak power of a battery pack—expressed in Watts—is equal to the peak power of a battery cell multiplied by the number of battery cells in a series-coupled string of battery cells multiplied by the number of blocks of cells coupled in series.

$$\text{peak power}_{pack} \text{ (W)} = \text{peak power}_{cell} \text{ (W)} \times (\text{number of cells/string}) \times (\text{number of blocks in series}) \qquad \text{Eq. 5}$$

Peak Power Density of a battery pack is equal to the peak power of the pack—expressed in Watts—divided by a volume—expressed in cm$^3$.

$$\text{peak power density}_{pack} = \text{peak power}_{pack} \text{ (W)/volume (cm}^3\text{)} \qquad \text{Eq. 6}$$

The maximum cell current is the maximum instantaneous current measured upon applying an approximately 5 milliOhm short across a cell.

For multi-voltage battery packs, the calculations—from the equations above and set forth in the table of FIGS. 12A-12F—were taken with the battery pack in its high voltage condition. In other words, the blocks were coupled in series.

Referring to FIG. 1, in one example embodiment, a power tool system 100 includes a set of battery packs 110 and a set of cordless power tools 120. The power tool system 100 also may include a charger 130. Each of the cordless power tools of the set of cordless power tools 120 may be powered by one of the battery packs of the set of battery packs 110. The set of power tools 120 may include, for example, an impact wrench 120a, a hammer drill 120b, and a grinder 120c. It is understood that the power tools 120a-120c illustrated in FIG. 1 are examples and that other power devices are contemplated to be included as part of the power tool system 100, even though not illustrated. In one example implementation, the cordless power tools 120 have a rated voltage of 20V. In other example implementations, the cordless power tools 120 may have a different rated voltage such as, for example, 12 V.

Each power tool 120a-120c includes a receptacle for receiving a battery pack. The power tool receptacle includes an interface for mating with the battery pack. The battery pack receptacle is configured with one interface for receiving one removable, rechargeable battery pack from the set of battery packs 110.

The charger 130 may be a corded charger that is configured to deliver power to one or more of the battery packs in the set of battery packs 110 to recharge the battery packs. While the charger 130 illustrated is a multi-port charger, it is understood that the charger 130 may be a single port charger or a charger with more than the two ports illustrated in FIG. 1. The charger 130 includes a receptacle 132 for receiving a battery pack 110. The receptacle 132 includes an interface (port) 134 for mating with the battery pack. Each charger receptacle is configured to receive one removable, rechargeable battery pack from the set of battery packs 110. The charger 130 is compatible with each of the battery packs in the set of battery packs 110 and is capable of recharging battery packs having a range of nominal voltages.

The set of battery packs 110 includes a same rated voltage and a same nominal voltage to match with the rated voltage of the set of cordless power tools 120. In one example implementation, the battery packs of the set of battery packs 110 have a rated voltage of 20 V and a nominal voltage of approximately 18 V that are compatible with the set of cordless power tools 120 having a rated voltage of 20 V. The battery packs of the set of battery packs 110 may include Li-ion battery cells having a nominal voltage of approximately about 3.6 V, an impedance ranging from approximately about 10 mΩ to approximately about 20 mΩ and a capacity of approximately about 1 AHr to approximately about 6 AHr. Impedance as referenced in this application is achieved by the following procedure—with a fully charged (100% state of charge) battery cell conditioned to room temperature, a first load of 0.1 A is applied to discharge the battery cell for 10 seconds followed by a 10 A load to discharge the battery cell for 1 second. This discharge loading sequence is cycled 3 times. During the 3rd cycle, measure the battery cell voltage and the battery cell current at the conclusion of the 0.1 A step which is defined as V1 and I1. Next measure voltage and current at the conclusion of the 10 A step which is defined as V2 and I2. Using the data values collected, apply the equation: Impedance=(V2−V1)/(I2−I1). This procedure can be repeated at other levels of battery charge such as 50% state of charge to further characterize the battery cell impedance.

Power can be determined from the 10 A DC constant current resistance procedure referred to in the impedance equation above when multiplied by the value for rated constant current of the cell or battery. This room temperature value for impedance may be used when calculating the power density of the battery pack or cell from its maximum rated constant current where it can reliably deliver a full or nearly full discharge. The room temperature volumetric power density is then further defined by dividing the power by the volume of the cell or battery. Herein, the power density is referred to by this definition.

However, impedance and power can be measured alternatively by other techniques as well which may include a variation of temperatures and test conditions, but typically rely upon constant current (galvanostatic), constant voltage (potentiostatic), constant resistance, or constant power techniques applied to the cell or battery pack. The constant resistance technique is provided as the basis for defining the peak power density from a volumetric characterization referred to later in this application. The constant resistance technique used for the peak power density of battery cells measured and provided in this application have specifically been collected using a highly stable electronic load. In those tests, the peak power is determined from either the cell or battery pack peak current near 100% SOC. In some instances, for defining cell peak power density, a constant 5 milliOhm resistance was used for the measurement and then this can be extrapolated to scale values for the battery pack power density. In other instances, another constant resistance value (e.g. 8 milliOhm) was applied to the battery pack directly for making peak power density calculations. This calculation used the max current ($I_{MAX}$) multiplied by the Voltage of the cell or battery at this condition divided its respective volume, according to; ($I_{MAX}$*V)/Volume in units of W/mL or W/cm$^3$. It is known that these peak power densities may not be a reliable or a safe method of operating the battery for extended or repeated use. However, this measurement can be made reliably for a single instance to understand the maximum limit of volumetric peak power density that is achievable for the battery.

The impedance of the battery may also be measured by various techniques that include both DC and AC methodologies. The DC resistance when measured with a time≲1 millisecond or at an AC frequency of 1 kHz is commonly applied to battery and cell characterization and provide a substantially similar value so are therefore referred to interchangeably. The impedance at 1 kHz can be reduced by the cell formfactor and typically, larger cells have lower AC impedance at 1 kHz while the opposite may be true for smaller cells. However, power density and peak power density can be maximized by reducing this value for all formfactors. Some cell formfactors, such as pouch cell batteries, with many electrode tabs connecting the cell terminals reduce this resistive contribution measured at 1 kHz. It is a defining feature of this invention to use cells and their corresponding battery packs with impedance measured at 1 kHz with minimal or optimized values in order to maximize the power density or corresponding battery packs. In 18650 or 21700 cells and batteries containing these traditional cylindrical cell formfactors, this value is not typically measured<8 milliOhms for those cell constructions. In some new constructions of battery packs with alternative formfactors, such as pouch cells, the AC 1 kHz impedance can be measured<6 milliOhms to achieve the maximum power density of this invention.

The set of battery packs 110 include a common interface that is compatible with a common interface of the set of cordless power tools 120. As discussed above, the common interface is the same basic structural feature on each battery pack in the set of battery packs 110 that mates with or engages with, both mechanically and electrically, to the common interface of one or more cordless power tools 120 and/or to one or more battery pack chargers 130 or charging stations. The common battery pack interface engages a battery pack receptacle on the cordless power tool that is sized and configured to receive the common battery pack interface. For instance, in one example implementation, a set of battery packs having a same nominal voltage (e.g., 10.8 V, 18 V, etc.) but different volumetric sizes may all have a common interface such that each battery pack in the set of battery packs mates with or engages with a same cordless power tool. Said another way, the cordless power tool is capable of using all of the battery packs in the set of battery packs because the common battery pack interface is the same and is matched to an common power tool interface even though the volumetric size is different for each battery pack.

Figure 2:
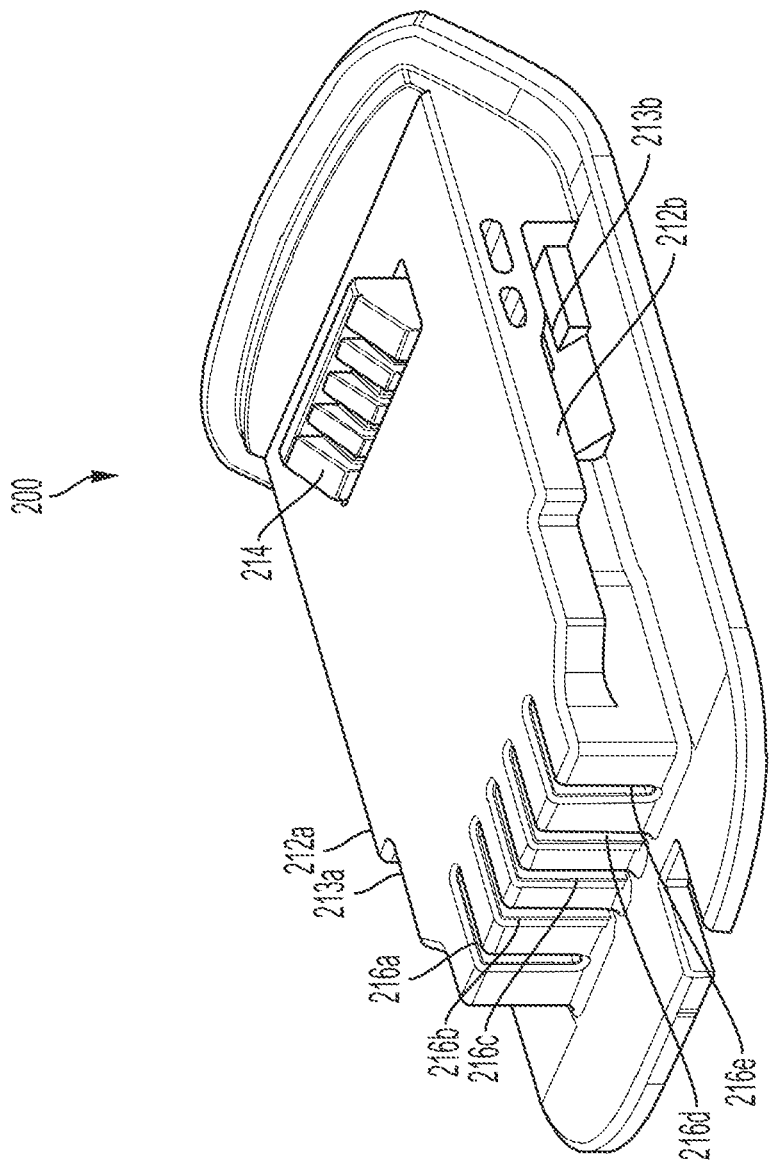
FIG. 2 illustrates a perspective view of a first example embodiment of a common interface for a set of battery packs.

Referring to FIG. 2, an example embodiment of a perspective view of a common battery pack interface 200 is illustrated. The common battery pack interface 200 is the same structure that is integrated with or used by each of the battery packs in the set of battery packs 110 of FIG. 1. It should be stated that the interface of one or more of the battery packs of the set of battery packs may include features in addition to the common battery pack interface features to enable the battery pack to operate with tools outside the set of tools 120 and other chargers in addition to the charger 130. For example, the battery pack interface may include a feature that allows the low/medium rated voltage battery packs of the set of battery packs 110 to operate with medium rated voltage power tools. The common interface 200 enables each of the battery packs in the set of battery packs 110 to operate with each of the power tools in the set of power tools 120 of FIG. 1 and the charger 130 of FIG. 1. In this manner, each of the power tools in the set of power tools 120 can be powered by each of the battery packs from the set of battery packs 110, which have a same nominal voltage but different characteristics such as, for example, different volumetric sizes, power densities, peak power densities, etc. Similarly, the charger 130 can charge each of the battery packs from the set of battery packs 110, which have a same nominal voltage but different characteristics such as, for example, different volumetric sizes, power densities, peak power densities, etc. Additionally, the charger 130 can charge other battery packs having the same basic (fundamental) interface and different nominal voltages and different characteristics.

The common interface 200 includes mechanical and electrical connections that engage with the battery receptacle on the cordless power tools. The common interface 200 includes a rail and groove system to enable the common interface 200 to mechanically engage the battery receptable of the cordless power tool. The rail and groove system enables the common interface to slidably engage with the battery receptacle of the cordless power tool. The rail and groove system includes a first rail 212a and a first groove 213a on one side of the common interface 200 and a second rail 212b and a second groove 213b on an opposite side of the common interface 200. The common interface 200 includes a latch mechanism 214 for retaining the battery pack in the battery receptacle of the cordless power tool. The latch mechanism 214 may depress as the common interface 200 slidably engages with the cordless power tool and then extend back into place using a spring action to retain the battery pack on the cordless power tool. The common interface 200 also includes multiple slots 216a-216e in the housing that are configured to allow access to a set of battery terminals and make electrical interconnections with corresponding tool terminals that are part of the tool common interface of the cordless power tool to deliver the power and/or data from the battery pack to the cordless power tool.

In some implementations (not shown), the common interface may use other types of mechanical connections and electrical connections that engage with a battery receptacle on the cordless power tools and chargers other than a rail and groove system. Of course, the battery receptacles on the cordless power tools and chargers would include interfaces capable of mating with a common interface having a different type of mechanical connection. In other words, it is understood that the common interface and a mating receptacle on a cordless power tool or charger may include different types of mechanical and electrical connections other than those illustrated and still fall within the scope of this disclosure.

Referring back to FIG. 1, each of the battery packs 110a-110h of the set of battery packs 110 may include different battery characteristics. FIGS. 3-10 illustrate, and the corresponding description discusses each of the battery packs 110a-110h, including the different characteristics such as, for example, volumetric sizes, power density, peak power density, etc. Each set of FIGS. 3A-3E through 10A-10E include five images related to one of the battery packs 110a-110h with the five images representing: A) an overall image of the battery pack representative of a total volume of the battery pack, B) an interior image of the battery pack—the battery pack housing removed—representative of an interior volume of the battery pack, C) a battery pack exterior image representative of that portion of the battery pack not received by a shroud of the power tool receptacle—non-shroud exterior, D) an interior image of the battery pack—the battery pack housing removed—representative of an interior volume of the battery pack of that portion of the battery pack not received by the shroud of the power tool—non-shroud interior, and E) an interior image of the battery pack—the battery pack housing removed—representative of a volume of the plurality of battery cells of the battery pack—cavity of cells.

Referring to FIGS. 3A-3E, a first example battery pack from the set of battery packs of FIG. 1 is illustrated. In FIGS.

Figure 3C:
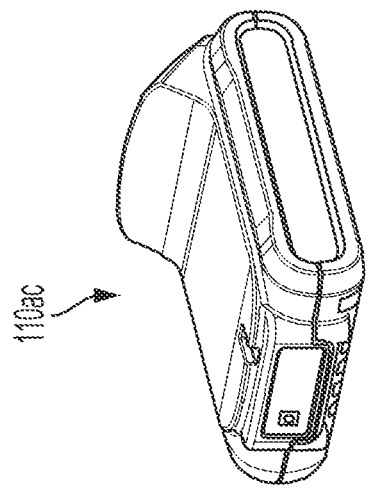
FIGS. 3A-3E illustrate a first example battery pack from the set of battery packs of FIG. 1.

3A-3E, the battery pack has a nominal voltage of approximately 18V and a rated voltage of approximately 20V. The battery pack may include battery cells having a cylindrical form factor, sometimes referred to as a cylindrical format or cylindrical configuration or cylindrical geometric shape. These battery cells may be, for example, 18650-sized battery cells in a 5S1P configuration meaning that there is one string of 5 battery cells with each battery cell having a nominal voltage of approximately 3.6V and a capacity of 2 AHr arranged in series with each other. In FIG. 3A, the battery pack total volume 110aa corresponds to an overall image of the battery pack 110a of FIG. 1 and represents a total volume of the battery pack. As discussed above, a total volume of the battery pack means the amount of three-dimensional (3D) space the entire battery pack takes up, including the common interface which is a part of the battery pack, as expressed in cubic units (e.g., cubic centimeters ($cm^3$)). In this example, the total volume 110aa of the battery pack 110a is approximately 287 $cm^3$. The maximum capacity of the battery pack 110a is approximately 2 AHr. The power density of the total volume 110aa of the battery pack 110a is approximately 1.9 $W/cm^3$ and the peak power density of the total volume 110aa of the battery pack 110a is approximately 5.8 $W/cm^3$.

Figure 3B:
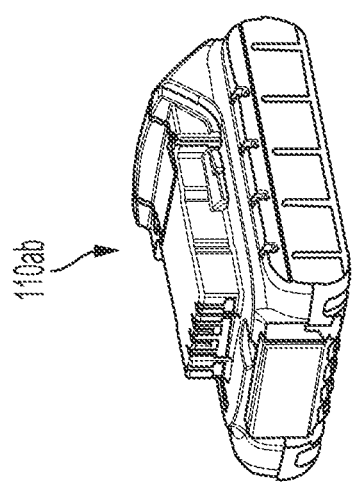
Figure 3A:
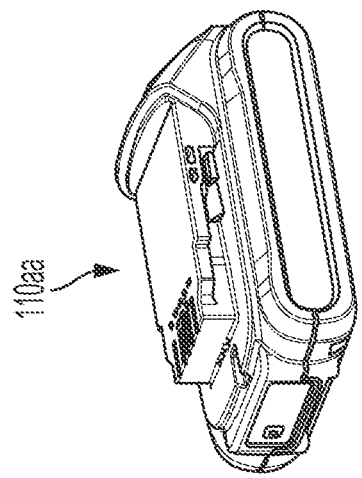

FIG. 3B illustrates an interior image of the battery pack 110a and represents an interior volume 110ab of the battery pack 110a—inside the walls of the battery pack housing. The interior volume of the battery pack means the amount of three-dimensional (3D) space taken up within the battery pack, including within the common interface, as expressed in cubic units (e.g., cubic centimeters ($cm^3$)). In this example, the interior volume 110ab of the battery pack 110a is approximately 210 $cm^3$.

FIG. 3C illustrates an exterior of the battery pack 110a and represents a volume 110ac of the battery pack 110a that is not within the tool foot shroud. The exterior volume of the battery pack outside the tool foot shroud means the amount of 3D space taken up by the battery pack not within the tool foot shroud, which does not include the common interface, as expressed in cubic units (e.g., cubic centimeters ($cm^3$)). In this example, the non-tool foot, exterior volume 110ac of the battery pack 110a is approximately 258 $cm^3$.

Figure 3E:
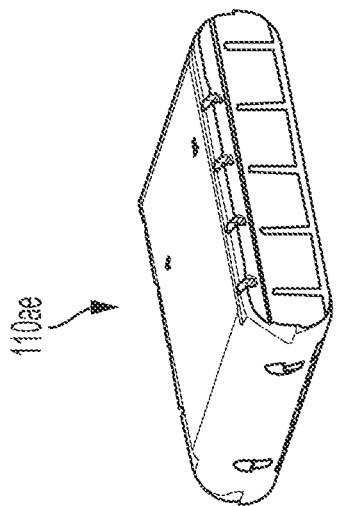
Figure 3D:
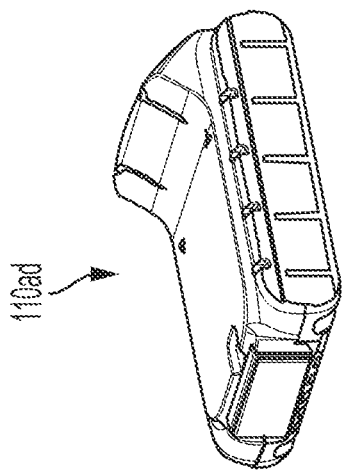

FIG. 3D illustrates an interior image of the battery pack 110a—inside the walls of the battery pack housing—representative of an interior volume 110ad of the battery pack 110a of that portion of the battery pack not received by the shroud of the power tool. The interior volume of the battery pack outside the tool foot shroud means the amount of 3D space taken up by the battery pack not within the tool foot shroud and sans the battery pack housing, which does not include the common interface, as expressed in cubic units (e.g., cubic centimeters ($cm^3$)). In this example, the non-tool foot, interior volume 110ad of the battery pack 110a is approximately 185 $cm^3$.

FIG. 3E illustrates a cavity of battery cells of the battery pack 110a and represents a volume 110ae of the cavity of the battery cells of the battery pack 110a. In general, the cavity of the battery cells houses the battery cells. That is, the battery cells of the battery pack are disposed within the cavity of the battery cells. The cavity of the battery cells volume of the battery pack 110a means the amount of 3D space taken up by the cavity of the battery cells, as expressed in cubic units (e.g., cubic centimeters ($cm^3$)). In this example, the volume 110ae of the cavity of the battery cells of the battery pack 110a is approximately 151 $cm^3$. The volume of the battery cells alone is approximately 82.7 $cm^3$.

Figure 4C:
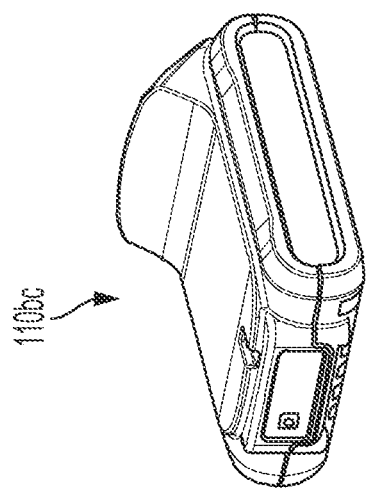
FIGS. 4A-4E illustrate a second example battery pack from the set of battery packs of FIG. 1.
Figure 4E:
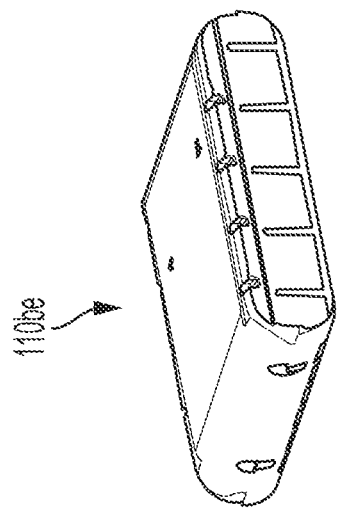
Figure 4B:
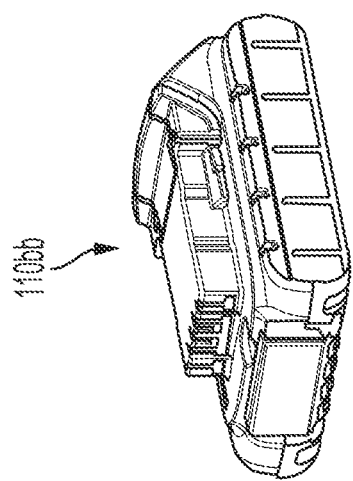
Figure 4A:
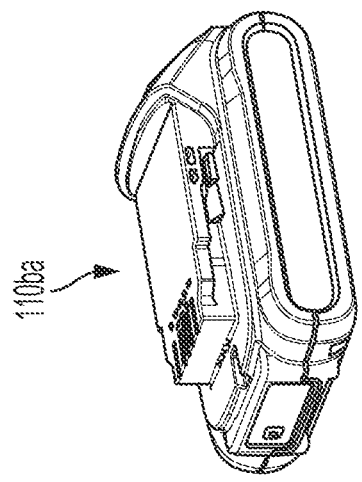

Referring to FIGS. 4A-4E, a second example battery pack from the set of battery packs of FIG. 1 is illustrated. In FIGS. 4A-4E, the battery pack has a nominal voltage of approximately 18V and a rated voltage of approximately 20V. The battery pack may include battery cells having a cylindrical form factor. These battery cells may be, for example, 18650-sized battery cells in a 5S1P configuration meaning that there is one string of 5 battery cells with each battery cell having a nominal voltage of approximately 3.6V and a capacity of 2 AHr arranged in series with each other. A difference between the second example battery pack and the first example battery pack of FIGS. 3A-3E is that in the second example battery pack approximately all of the space between the battery cells has been removed. In other words, in the first example embodiment of the battery pack 110a, there may be thermal spacers, for example, between adjacent battery cells. In FIG. 4A, the battery pack total volume 110ba corresponds to an overall image of the battery pack 110b of FIG. 1 and represents a total volume 110ba of the battery pack 110a. As discussed above, a total volume of the battery pack means the amount of 3D space the entire battery pack takes up, including the common interface which is a part of the battery pack, as expressed in cubic units (e.g., cubic centimeters ($cm^3$)). In this example, the total volume 110ba of the battery pack 110b is approximately 278 $cm^3$. The maximum capacity of the battery pack 110b is approximately 2 AHr. The power density of the total volume 110ba of the battery pack 110b is approximately 2.0 $W/cm^3$ and the peak power density of the total volume 110ba of the battery pack 110b is approximately 6.0 $W/cm^3$.

FIG. 4B illustrates an interior image of the battery pack 110b and represents an interior volume 110bb of the battery pack 110b—inside the walls of the battery pack housing. The interior volume of the battery pack means the amount of 3D space taken up within the battery pack, including within the common interface, as expressed in cubic units (e.g., cubic centimeters ($cm^3$)). In this example, the interior volume 110bb of the battery pack 110b is approximately 203 $cm^3$.

FIG. 4C illustrates an exterior of the battery pack 110b and represents a volume 110bc of the battery pack 110b that is not within the tool foot shroud. The exterior volume 110bc of the battery pack outside the tool foot shroud means the amount of 3D space taken up by the battery pack not within the tool foot shroud, which does not include the common interface, as expressed in cubic units (e.g., cubic centimeters ($cm^3$)). In this example, the non-tool foot, exterior volume 110bc of the battery pack 110b is approximately 249 $cm^3$.

Figure 4D:
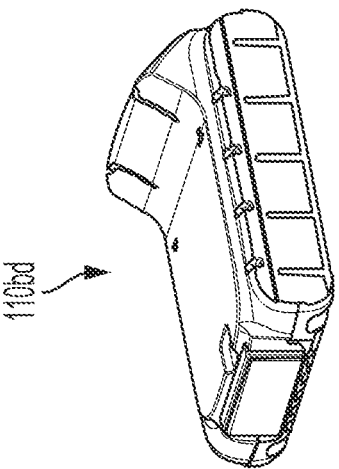

FIG. 4D illustrates an interior image of the battery pack 110b—inside the walls of the battery pack housing—representative of an interior volume 110bd of the battery pack 110b of that portion of the battery pack not received by the shroud of the power tool. The interior volume 110bd of the battery pack outside the tool foot shroud means the amount of 3D space taken up by the battery pack not within the tool foot shroud and sans the battery pack housing, which does not include the common interface, as expressed in cubic units (e.g., cubic centimeters ($cm^3$)). In this example, the non-tool foot, interior volume 110bd of the battery pack 110b is approximately 179 $cm^3$.

FIG. 4E illustrates a cavity of battery cells of the battery pack 110be and represents a volume 110be of the cavity of the battery cells of the battery pack 110b. In general, the cavity of the battery cells houses the battery cells. That is, the battery cells of the battery pack are disposed within the cavity of the battery cells. The cavity of the battery cells volume 110be of the battery pack 110b means the amount of 3D space taken up by the cavity of the battery cells, as expressed in cubic units (e.g., cubic centimeters ($cm^3$)). In this example, the volume 110*be* of the cavity of the battery cells of the battery pack 110*b* is approximately 144 cm$^3$. The volume of the battery cells alone is approximately 82.7 cm$^3$.

The battery pack 110*b* has a smaller total volume than the battery pack 110*a*, yet the battery pack 110*b* has a greater total volume power density and total volume peak power density than the battery pack 110*a*.

Figure 5C:
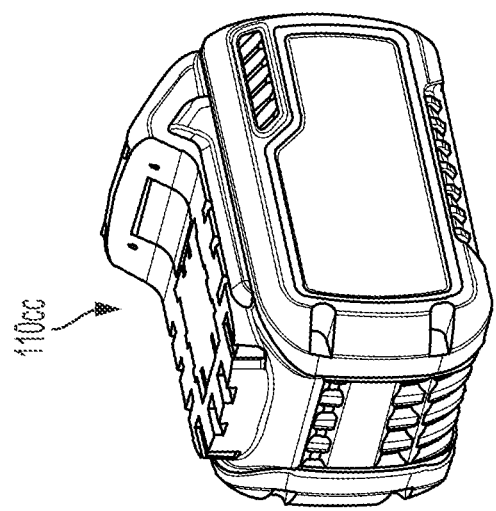
FIGS. 5A-5E illustrate a third example battery pack from the set of battery packs of FIG. 1.
Figure 5E:
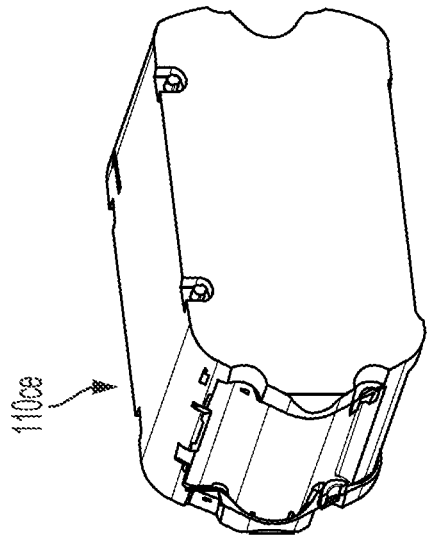
Figure 5B:
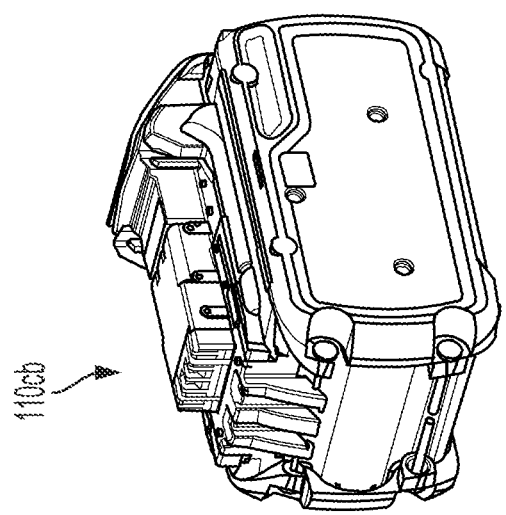
Figure 5A:
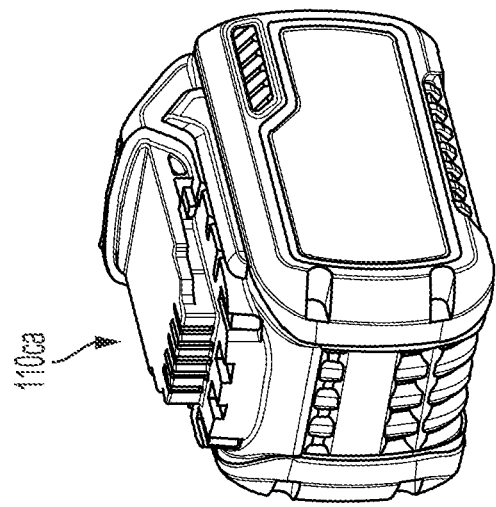

Referring to FIGS. 5A-5E, a third example battery pack from the set of battery packs of FIG. 1 is illustrated. This battery pack is similar to the battery packs described in U.S. Pat. No. 10,056,582, which is incorporated herein by reference. As such, the battery pack may have a nominal voltage of approximately 18V and a rated voltage of approximately 20V or a nominal voltage of approximately 54V and a rated voltage of approximately 60V. The battery pack may include battery cells having a cylindrical form factor. These battery cells may be, for example, fifteen (15) 21700-sized battery cells. The battery cells may be configured in a 5S3P (18V nominal voltage) or a 15S1P (54V nominal voltage) configuration with each battery cell having a nominal voltage of approximately 3.6V and a capacity 4 AHr. In FIG. 5A, the battery pack 110*ca* corresponds to an overall image of the battery pack 110*c* of FIG. 1 and represents a total volume of the battery pack. As discussed above, a total volume of the battery pack means the amount of 3D space the entire battery pack takes up, including the common interface which is a part of the battery pack, as expressed in cubic units (e.g., cubic centimeters (cm$^3$)). In this example, the total volume 110*ca* of the battery pack 110*c* is approximately 860 cm$^3$. The maximum capacity of the battery pack 110*c* is approximately 12 AHr—when the cells are connected in the 5S3P configuration and 4 AHr—when the cells are connected in the 15S1P configuration. The power density of the total volume 110*ca* of the battery pack 110*c* is approximately 2.2 W/cm$^3$ and the peak power density of the total volume 110*ca* of the battery pack 110*c* is approximately 7.8 W/cm$^3$.

FIG. 5B illustrates an interior image of the battery pack 110*c* and represents an interior volume 110*cb* of the battery pack 110*c*—inside the walls of the battery pack housing. The interior volume 110*cb* of the battery pack means the amount of 3D space taken up within the battery pack, including within the common interface, as expressed in cubic units (e.g., cubic centimeters (cm$^3$)). In this example, the interior volume 110*cb* of the battery pack 110*c* is approximately 644 cm$^3$.

FIG. 5C illustrates an exterior of the battery pack 110*c* and represents a volume 110*cc* of the battery pack 110*c* that is not within the tool foot shroud. The exterior volume 110*cc* of the battery pack outside the tool foot shroud means the amount of 3D space taken up by the battery pack not within the tool foot shroud, which does not include the common interface, as expressed in cubic units (e.g., cubic centimeters (cm$^3$)). In this example, the non-tool foot, exterior volume 110*cc* of the battery pack 110*c* is approximately 831 cm$^3$.

Figure 5D:
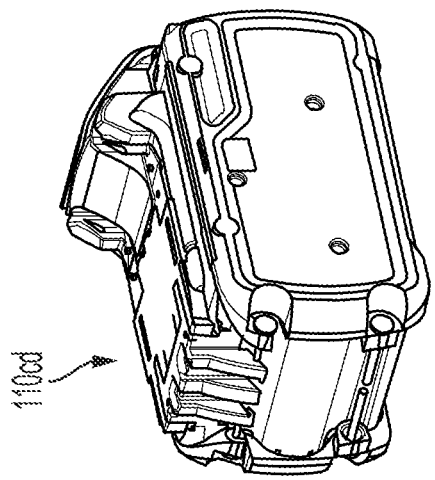

FIG. 5D illustrates an interior image of the battery pack—inside the walls of the battery pack housing—representative of an interior volume 110*cd* of the battery pack of that portion of the battery pack not received by the shroud of the power tool. The interior volume 110*cd* of the battery pack outside the tool foot shroud means the amount of 3D space taken up by the battery pack not within the tool foot shroud and sans the battery pack housing, which does not include the common interface, as expressed in cubic units (e.g., cubic centimeters (cm$^3$)). In this example, the non-tool foot, interior volume 110*cd* of the battery pack 110*c* is approximately 624 cm$^3$.

FIG. 5E illustrates a cavity of battery cells of the battery pack 110*c* and represents a volume 110*ce* of the cavity of the battery cells of the battery pack 110*c*. In general, the cavity of the battery cells houses the battery cells. That is, the battery cells of the battery pack are disposed within the cavity of the battery cells. The cavity of the battery cells volume 110*ce* of the battery pack 110*c* means the amount of 3D space taken up by the cavity of the battery cells, as expressed in cubic units (e.g., cubic centimeters (cm$^3$)). In this example, the volume 110*ce* of the cavity of the battery cells of the battery pack 110*c* is approximately 514 cm$^3$. The volume of the battery cells alone is approximately 363.7 cm$^3$.

Referring to FIGS. 6A-6E, a fourth example battery pack from the set of battery packs of FIG. 1 is illustrated. This battery pack is similar to the battery packs described in U.S. Pat. No. 10,056,582, which is incorporated herein by reference. As such, the battery pack may have a nominal voltage of approximately 18 V and a rated voltage of approximately 20 V or a nominal voltage of approximately 54 V and a rated voltage of approximately 60 V. The battery pack may include battery cells having a cylindrical form factor. These battery cells may be, for example, thirty (30) 18650-sized battery cells. The battery cells may be arranged in various configurations with each battery cell having a nominal voltage of approximately 3.6 V, where the various configurations of battery cells are capable of achieving the above nominal and rated voltages.

Figure 6C:
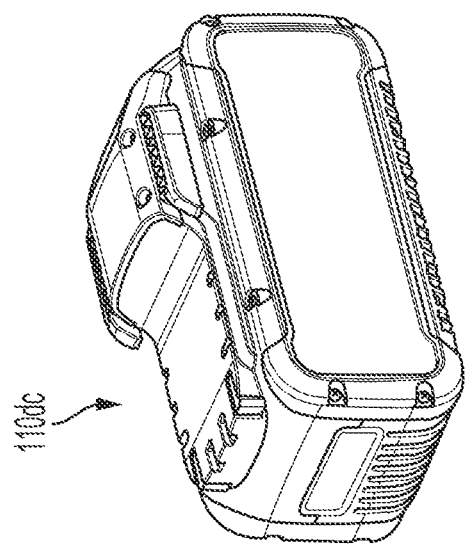
FIGS. 6A-6E illustrate a fourth example battery pack from the set of battery packs of FIG. 1.
Figure 6B:
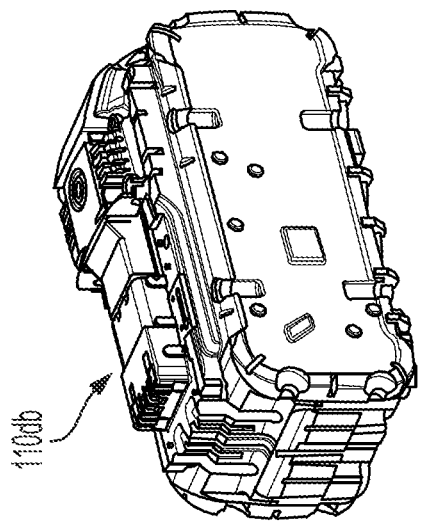
Figure 6A:
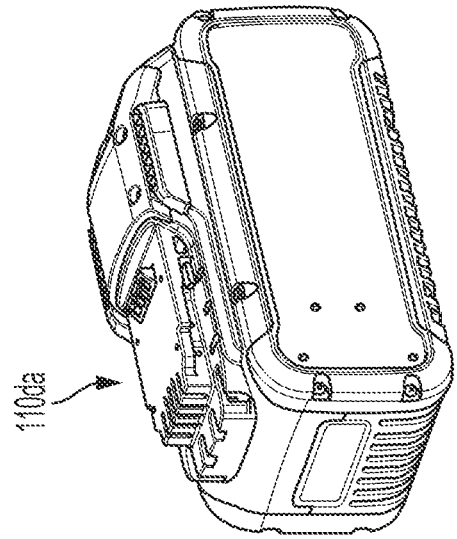

In FIG. 6A, the battery pack corresponds to an overall image of the battery pack 110*d* of FIG. 1 and represents a total volume 110*da* of the battery pack 110*d*. As discussed above, a total volume of the battery pack means the amount of 3D space the entire battery pack takes up, including the common interface which is a part of the battery pack, as expressed in cubic units (e.g., cubic centimeters (cm$^3$)). In this example, the total volume 110*da* of the battery pack 110*d* is approximately 1272 cm$^3$. The maximum capacity of the battery pack 110*da* is approximately 5 AHr. It is understood that the maximum capacity provided in this example, as well as all of the other examples, are not meant to be limiting and that other capacity values are possible. The power density of the total volume 110*da* the battery pack 110*d* is approximately 2.5 W/cm$^3$ and the peak power density of the total volume 110*da* the battery pack 110*d* is approximately 7.8 W/cm$^3$.

FIG. 6B illustrates an interior image of the battery pack 110*d* and represents an interior volume 110*db* of the battery pack 110*d*—inside the walls of the battery pack housing. The interior volume 110*db* of the battery pack means the amount of 3D space taken up within the battery pack, including within the common interface, as expressed in cubic units (e.g., cubic centimeters (cm$^3$)). In this example, the interior volume 110*db* of the battery pack 110*d* is approximately 1006 cm$^3$.

FIG. 6C illustrates an exterior of the battery pack 110*d* and represents a volume 110*dc* of the battery pack 110*d* that is not within the tool foot shroud. The exterior volume 110*dc* of the battery pack outside the tool foot shroud means the amount of 3D space taken up by the battery pack not within the tool foot shroud, which does not include the common interface, as expressed in cubic units (e.g., cubic centimeters (cm$^3$)). In this example, the non-tool foot, exterior volume 110*dc* of the battery pack 110*d* is approximately 1243 cm$^3$.

Figure 6E:
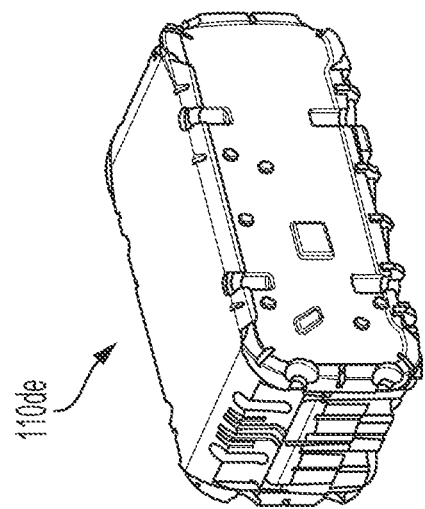
Figure 6D:
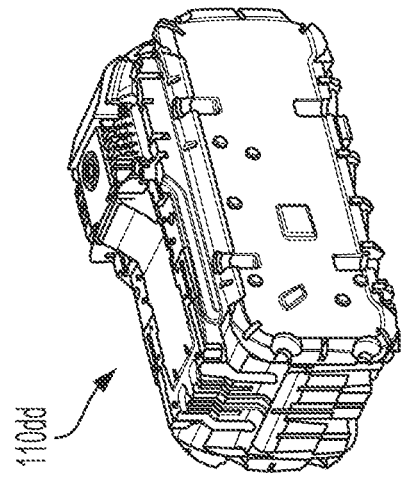

FIG. 6D illustrates an interior image of the battery pack 110*d*—inside the walls of the battery pack housing—representative of an interior volume 110*dd* of the battery pack 110*d* of that portion of the battery pack not received by the shroud of the power tool. The interior volume 110dd of the battery pack outside the tool foot shroud means the amount of 3D space taken up by the battery pack not within the tool foot shroud and sans the battery pack housing, which does not include the common interface, as expressed in cubic units (e.g., cubic centimeters ($cm^3$)). In this example, the non-tool foot, interior volume 110dd of the battery pack 110d is approximately 985 $cm^3$.

FIG. 6E illustrates a cavity of battery cells of the battery pack 110d and represents a volume 110de of the cavity of the battery cells of the battery pack 110d. In general, the cavity of the battery cells houses the battery cells. That is, the battery cells of the battery pack are disposed within the cavity of the battery cells. The cavity of the battery cells volume 110de of the battery pack 110d means the amount of 3D space taken up by the cavity of the battery cells, as expressed in cubic units (e.g., cubic centimeters ($cm^3$)). In this example, the volume 110de of the cavity of the battery cells of the battery pack 110d is approximately 874 $cm^3$. The volume of the battery cells alone is approximately 496.2 $cm^3$.

Figure 7C:
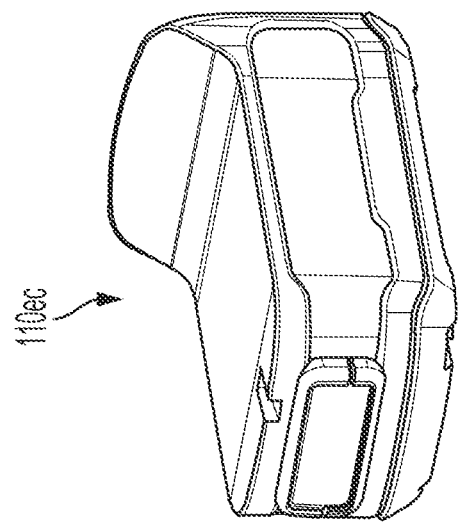
FIGS. 7A-7E illustrate a fifth example battery pack from the set of battery packs of FIG. 1.
Figure 7E:
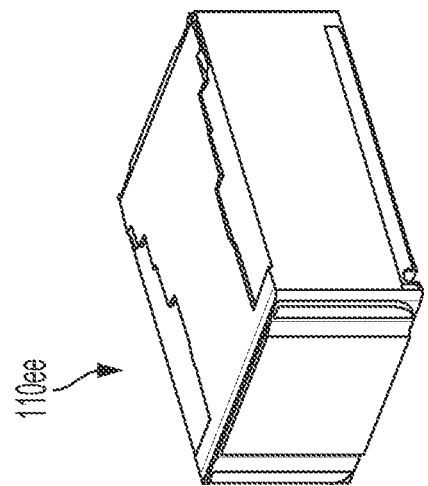
Figure 7B:
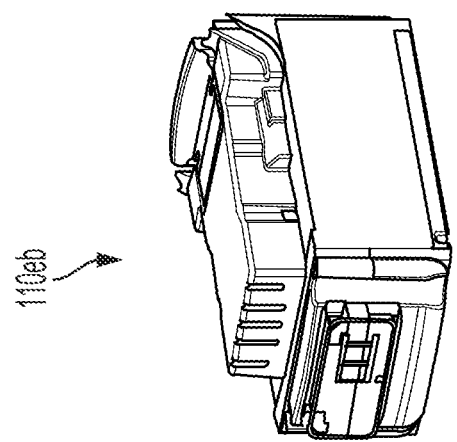
Figure 7A:
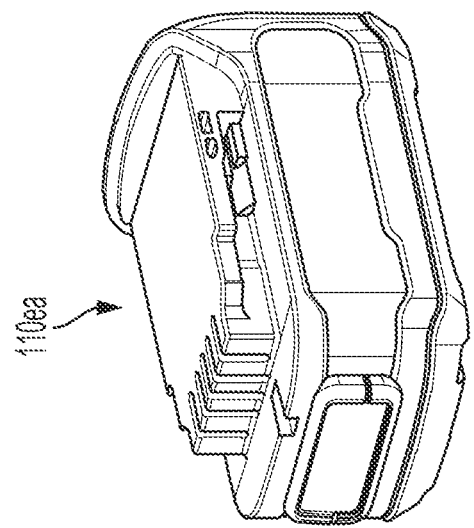

Referring to FIGS. 7A-7E, a fifth example battery pack from the set of battery packs of FIG. 1 is illustrated. In FIGS. 7A-7E, the battery pack has a nominal voltage of approximately 18 V and a rated voltage of approximately 20V. The battery pack may include battery cells having a pouch form factor. These battery cells may be, for example, pouch-type battery cells in a 5S1P configuration meaning that there are 5 battery cells with each battery cell having a nominal voltage of approximately 3.6 V and a capacity of 1.4 AHr arranged in series. In FIG. 7A, the battery pack 110ea corresponds to an overall image of the battery pack 110e of FIG. 1 and represents a total volume 110ea of the battery pack 110e. As discussed above, a total volume 110ea of the battery pack 110e means the amount of 3D space the entire battery pack takes up, including the common interface which is a part of the battery pack, as expressed in cubic units (e.g., cubic centimeters ($cm^3$)). In this example, the total volume 110ea of the battery pack 110e is approximately 228 $cm^3$. The maximum capacity of the battery pack 110e is approximately 1.4 AHr. The power density of the total volume 110ea of the battery pack 110e is approximately 3.2 $W/cm^3$ and the peak power density of the total volume 110ea of the battery pack 110e is approximately 9.9 $W/cm^3$.

FIG. 7B illustrates an interior image of the battery pack 110e and represents an interior volume 110eb of the battery pack 110e—inside the walls of the battery pack housing. The interior volume 110eb of the battery pack 110e means the amount of 3D space taken up within the battery pack, including within the common interface, as expressed in cubic units (e.g., cubic centimeters ($cm^3$)). In this example, the interior volume 110eb of the battery pack 110e is approximately 162 $cm^3$.

FIG. 7C illustrates an exterior of the battery pack 110e and represents a volume 110ec of the battery pack 110e that is not within the tool foot shroud. The exterior volume 110ec of the battery pack outside the tool foot shroud means the amount of 3D space taken up by the battery pack not within the tool foot shroud, which does not include the common interface, as expressed in cubic units (e.g., cubic centimeters ($cm^3$)). In this example, the non-tool foot, exterior volume 110ec of the battery pack 110e is approximately 199.5 $cm^3$.

Figure 7D:
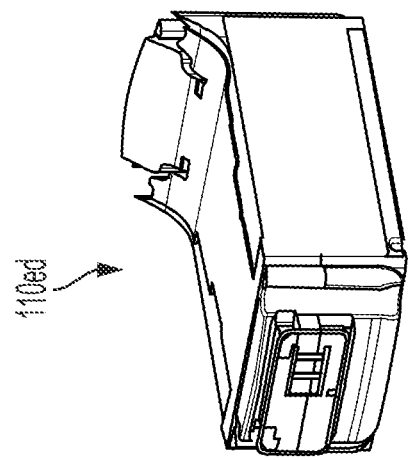

FIG. 7D illustrates an interior image of the battery pack 110e—inside the walls of the battery pack housing—representative of an interior volume 110ed of the battery pack 110e of that portion of the battery pack not received by the shroud of the power tool. The interior volume 110ed of the battery pack outside the tool foot shroud means the amount of 3D space taken up by the battery pack not within the tool foot shroud and sans the battery pack housing, which does not include the common interface, as expressed in cubic units (e.g., cubic centimeters ($cm^3$)). In this example, the non-tool foot interior volume 110ed of the battery pack 110e is approximately 136 $cm^3$.

FIG. 7E illustrates a cavity of battery cells of the battery pack 110e and represents a volume 110ee of the cavity of the battery cells of the battery pack 110e. In general, the cavity of the battery cells houses the battery cells. That is, the battery cells of the battery pack are disposed within the cavity of the battery cells. The cavity of the battery cells volume 110ee of the battery pack 110e means the amount of 3D space taken up by the cavity of the battery cells, as expressed in cubic units (e.g., cubic centimeters ($cm^3$)). In this example, the volume 110ee of the cavity of the battery cells of the battery pack 110e is approximately 92.7 $cm^3$. The volume of the battery cells alone is approximately 60 $cm^3$.

Figure 8C:
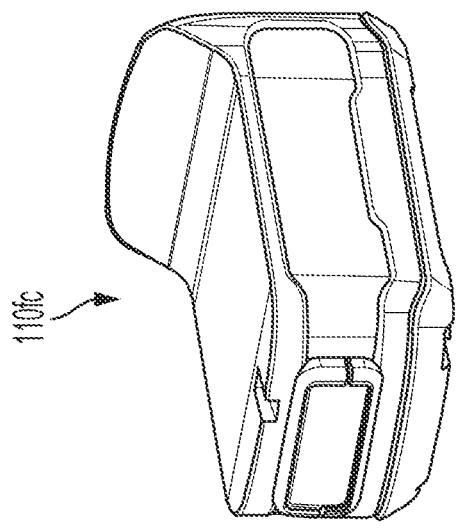
FIGS. 8A-8E illustrate a sixth example battery pack from the set of battery packs of FIG. 1.
Figure 8E:
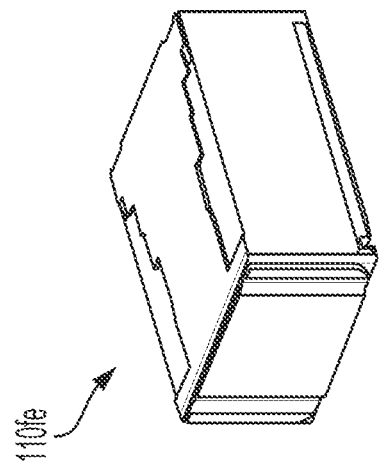
Figure 8B:
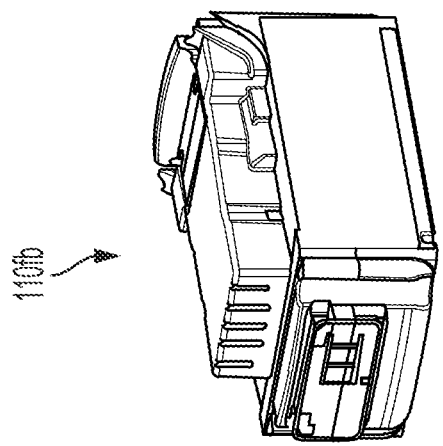
Figure 8A:
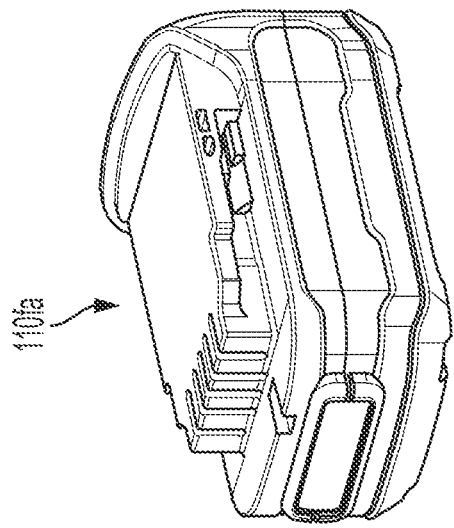

Referring to FIGS. 8A-8E, a sixth example battery pack from the set of battery packs of FIG. 1 is illustrated. In FIGS. 8A-8E, the battery pack has a nominal voltage of approximately 18 V and a rated voltage of approximately 20 V. The battery pack may include battery cells having a cylindrical form factor. These battery cells may be, for example, pouch-type battery cells in a 5S1P configuration meaning that there are 5 battery cells with each battery cell having a nominal voltage of approximately 3.6V and a capacity of 1.4 AHr arranged in series with each other. In FIG. 8A, the battery pack 110f corresponds to an overall image of the battery pack 110f of FIG. 1 and represents a total volume 110fa of the battery pack 110f. As discussed above, a total volume 110fa of the battery pack 110f means the amount of 3D space the entire battery pack takes up, including the common interface which is a part of the battery pack, as expressed in cubic units (e.g., cubic centimeters ($cm^3$)). In this example, the total volume 110fa of the battery pack 110f is approximately 212 $cm^3$. The maximum capacity of the battery pack 110f is approximately 1.4 AHr. The power density of the total volume 110fa of the battery pack 110f is approximately 3.4 $W/cm^3$ and the peak power density of the total volume 110fa of the battery pack 110f is approximately 10.7 $W/cm^3$.

FIG. 8B illustrates an interior image of the battery pack 110f and represents an interior volume 110fb of the battery pack 110f—inside the walls of the battery pack housing. The interior volume 110fb of the battery pack 110f means the amount of 3D space taken up within the battery pack, including within the common interface, as expressed in cubic units (e.g., cubic centimeters ($cm^3$)). In this example, the interior volume 110fb of the battery pack 110f is approximately 148 $cm^3$.

FIG. 8C illustrates an exterior of the battery pack 110f and represents a volume 110fc of the battery pack 110f that is not within the tool foot shroud. The exterior volume 110fc of the battery pack 110f outside the tool foot shroud means the amount of 3D space taken up by the battery pack not within the tool foot shroud, which does not include the common interface, as expressed in cubic units (e.g., cubic centimeters ($cm^3$)). In this example, the non-tool foot, exterior volume 110fc of the battery pack 110f is approximately 183 $cm^3$.

Figure 8D:
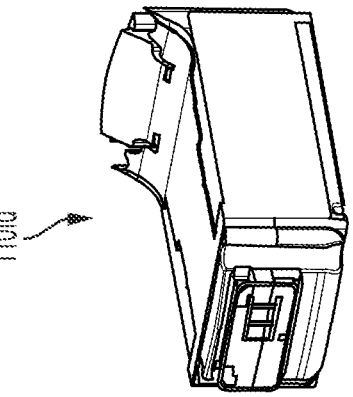

FIG. 8D illustrates an interior image of the battery pack—inside the walls of the battery pack housing—representative of an interior volume 110fd of the battery pack 110f of that portion of the battery pack not received by the shroud of the power tool. The interior volume 110fd of the battery pack 110f outside the tool foot shroud means the amount of 3D space taken up by the battery pack not within the tool foot shroud and sans the battery pack housing, which does not include the common interface, as expressed in cubic units (e.g., cubic centimeters (cm³)). In this example, the non-tool foot, interior volume 110fd of the battery pack 110f is approximately 123 cm³.

FIG. 8E illustrates a cavity of battery cells of the battery pack 110f and represents a volume 110fe of the cavity of the battery cells of the battery pack 110f. In general, the cavity of the battery cells houses the battery cells. That is, the battery cells of the battery pack are disposed within the cavity of the battery cells. The cavity of the battery cells volume 110fe of the battery pack 110f means the amount of 3D space taken up by the cavity of the battery cells, as expressed in cubic units (e.g., cubic centimeters (cm³)). In this example, the volume 110fe of the cavity of the battery cells of the battery pack 110f is approximately 82.6 cm³. The volume of the battery cells alone is approximately 60 cm³.

Figure 9A:
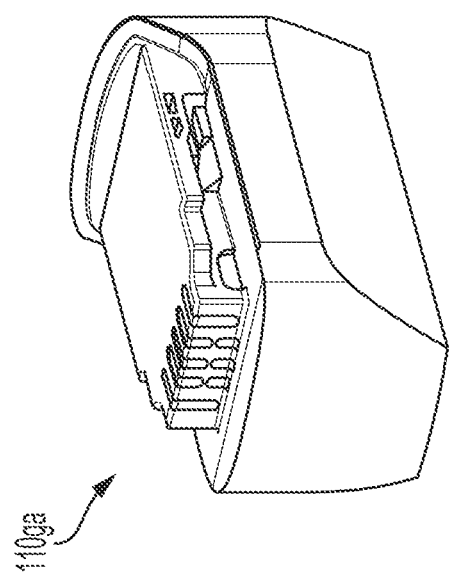
FIGS. 9A-9E illustrate a seventh example battery pack from the set of battery packs of FIG. 1.

Referring to FIGS. 9A-9E, a seventh example battery pack from the set of battery packs of FIG. 1 is illustrated. In FIGS. 9A-9E, the battery pack has a nominal voltage of approximately 18V and a rated voltage of approximately 20V. The battery pack may include battery cells having a cylindrical form factor. These battery cells may be, for example, 18650-sized battery cells in a 5S1P configuration meaning that there is one string of 5 battery cells with each battery cell having a nominal voltage of approximately 3.6 V and a capacity of 2 AHr arranged in series with each other. In this example, the battery cell orientation is aligned with the length of the battery pack with the battery cells being stacked and nested relative to one another. In FIG. 9A, the battery pack 110g corresponds to an overall image of the battery pack 110g of FIG. 1 and represents a total volume 110ga of the battery pack 110g. As discussed above, a total volume 110ga of the battery pack 110g means the amount of 3D space the entire battery pack takes up, including the common interface which is a part of the battery pack, as expressed in cubic units (e.g., cubic centimeters (cm³)). In this example, the total volume 110ga of the battery pack 110g is approximately 255 cm³. The maximum Amp Hours of the battery pack 110g is approximately 2 AHr. The power density of the total volume 110ga of the battery pack 110g is approximately 2.1 W/cm³ and the peak power density of the total volume 110ga of the battery pack 110g is approximately 6.6 W/cm³.

Figure 9B:
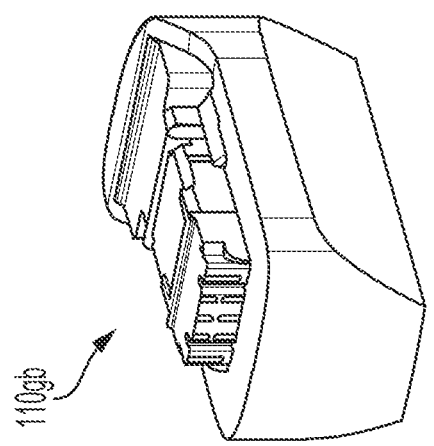

FIG. 9B illustrates an interior image of the battery pack 110g and represents an interior volume 110gb of the battery pack 110g—inside the walls of the battery pack housing. The interior volume 110gb of the battery pack 110g means the amount of 3D space taken up within the battery pack, including within the common interface, as expressed in cubic units (e.g., cubic centimeters (cm³)). In this example, the interior volume 110gb of the battery pack 110g is approximately 195 cm³.

Figure 9C:
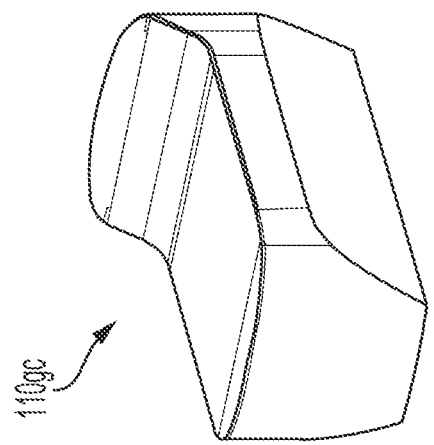

FIG. 9C illustrates an exterior of the battery pack 110g and represents a volume 110gc of the battery pack 110g that is not within the tool foot shroud. The exterior volume 110gc of the battery pack outside the tool foot shroud means the amount of 3D space taken up by the battery pack not within the tool foot shroud, which does not include the common interface, as expressed in cubic units (e.g., cubic centimeters (cm³)). In this example, the non-tool foot, exterior volume 110gc of the battery pack 110g is approximately 226 cm³.

Figure 9D:
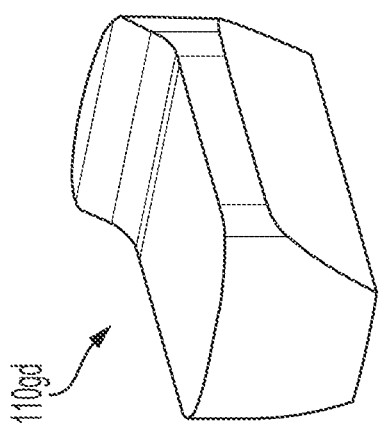

FIG. 9D illustrates an interior image of the battery pack 110g—inside the walls of the battery pack housing—representative of an interior volume 110gd of the battery pack 110g of that portion of the battery pack not received by the shroud of the power tool. The interior volume 110gd of the battery pack 110g outside the tool foot shroud means the amount of 3D space taken up by the battery pack not within the tool foot shroud and sans the battery pack housing, which does not include the common interface, as expressed in cubic units (e.g., cubic centimeters (cm³)). In this example, the non-tool foot, interior volume 110gd of the battery pack 110g is approximately 173 cm³.

Figure 9E:
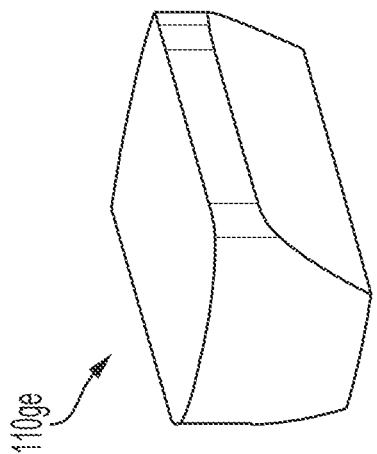

FIG. 9E illustrates a cavity of battery cells of the battery pack 110g and represents a volume 110ge of the cavity of the battery cells of the battery pack 110g. In general, the cavity of the battery cells houses the battery cells. That is, the battery cells of the battery pack are disposed within the cavity of the battery cells. The cavity of the battery cells volume 110ge of the battery pack 110g means the amount of 3D space taken up by the cavity of the battery cells, as expressed in cubic units (e.g., cubic centimeters (cm³)). In this example, the volume 110ge of the cavity of the battery cells of the battery pack 110g is approximately 113 cm³. The volume of the battery cells alone is approximately 82.7 cm³.

Figure 10C:
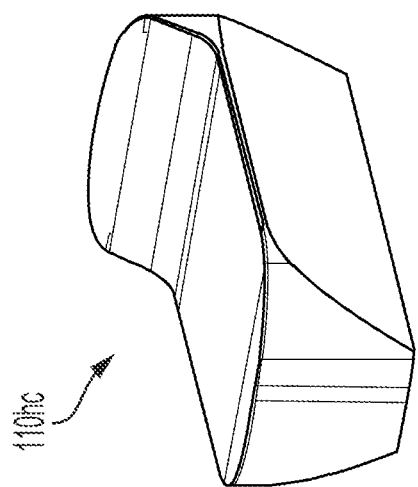
FIGS. 10A-10E illustrate an eighth example battery pack from the set of battery packs of FIG. 1.
Figure 10B:
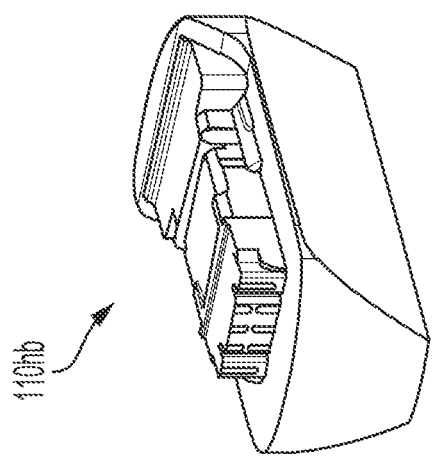
Figure 10A:
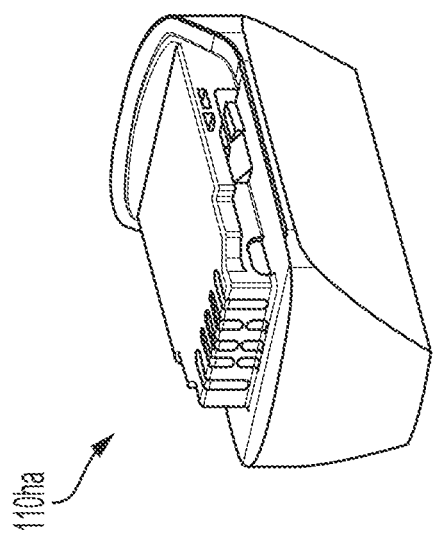

Referring to FIGS. 10A-10E, an eighth example battery pack from the set of battery packs of FIG. 1 is illustrated. In FIGS. 10A-10E, the battery pack has a nominal voltage of approximately 18V and a rated voltage of approximately 20V. The battery pack may include battery cells having a cylindrical form factor. These battery cells may be, for example, 14650-sized battery cells in a 5S1P configuration meaning that there is 1 string of 5 battery cells with each battery cell having a nominal voltage of approximately 3.6 V arranged in series with each other. In this example, the battery cell orientation is aligned with the length of the battery pack with the battery cells being stacked and nested relative to one another. In FIG. 10A, the battery pack corresponds to an overall image of the battery pack 110h of FIG. 1 and represents a total volume 110ha of the battery pack 110h. As discussed above, a total volume 110ha of the battery pack 110h means the amount of 3D space the entire battery pack takes up, including the common interface which is a part of the battery pack, as expressed in cubic units (e.g., cubic centimeters (cm³)). In this example, the total volume 110ha of the battery pack 110h is approximately 150 cm³. The maximum capacity of the battery pack 110h is approximately 1.3 AHr. The power density of the total volume 110ha of the battery pack 110h is approximately 2.4 W/cm³ and the peak power density of the total volume 110ha of the battery pack 110h is approximately 6.0 W/cm³.

FIG. 10B illustrates an interior image of the battery pack 110h and represents an interior volume 110hd of the battery pack 110h—inside the walls of the battery pack housing. The interior volume 110hd of the battery pack 110h means the amount of 3D space taken up within the battery pack, including within the common interface, as expressed in cubic units (e.g., cubic centimeters (cm³)). In this example, the interior volume 110hd of the battery pack 110h is approximately 123 cm³.

FIG. 10C illustrates an exterior of the battery pack 110h and represents a volume 110hc of the battery pack 110h that is not within the tool foot shroud. The exterior volume 110hc of the battery pack 110h outside the tool foot shroud means the amount of 3D space taken up by the battery pack not within the tool foot shroud, which does not include the common interface, as expressed in cubic units (e.g., cubic centimeters (cm³)). In this example, the non-tool foot, exterior volume 110hc of the battery pack 110h is approximately 122 cm³.

Figure 10E:
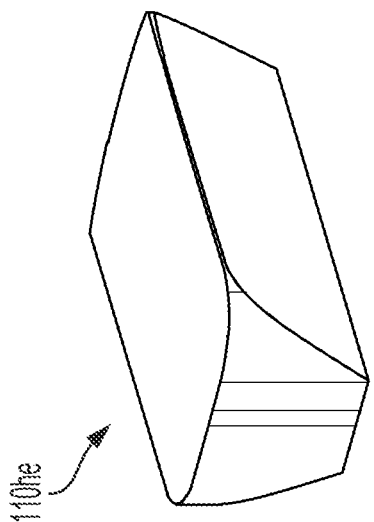
Figure 10D:
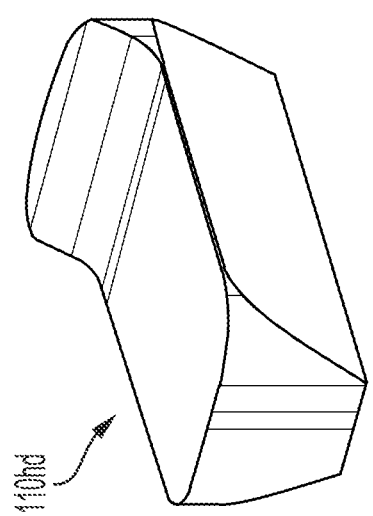

FIG. 10D illustrates an interior image of the battery pack 110*h*—inside the walls of the battery pack housing—representative of an interior volume 110*hd* of the battery pack 110*h* of that portion of the battery pack not received by the shroud of the power tool. The interior volume 110*hd* of the battery pack 110*h* outside the tool foot shroud means the amount of 3D space taken up by the battery pack not within the tool foot shroud and sans the battery pack housing, which does not include the common interface, as expressed in cubic units (e.g., cubic centimeters ($cm^3$)). In this example, the non-tool foot, interior volume 110*hd* of the battery pack 110*h* is approximately 101 $cm^3$.

FIG. 10E illustrates a cavity of battery cells of the battery pack 110*h* and represents a volume 110*he* of the cavity of the battery cells of the battery pack 110*h*. In general, the cavity of the battery cells houses the battery cells. That is, the battery cells of the battery pack are disposed within the cavity of the battery cells. The cavity of the battery cells volume 110*he* of the battery pack 110*h* means the amount of 3D space taken up by the cavity of the battery cells, as expressed in cubic units (e.g., cubic centimeters ($cm^3$)). In this example, the volume 110*he* of the cavity of the battery cells of the battery pack 110*h* is approximately 79.9 $cm^3$. The volume of the battery cells alone is approximately 50 $cm^3$.

Figure 11:
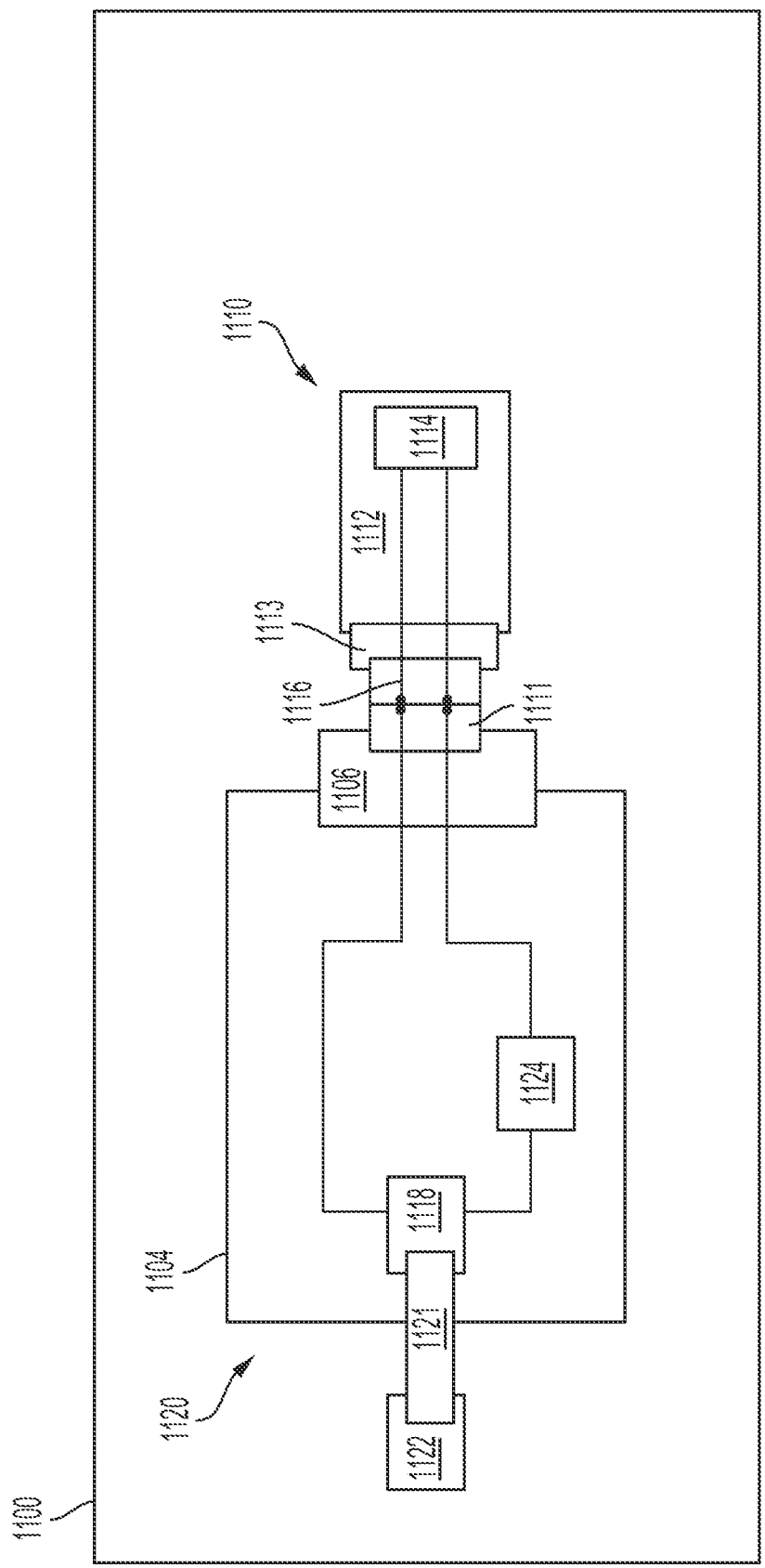
FIG. 11 is a block diagram of an example embodiment of a power tool system.

Referring to FIG. 11, an example block diagram of a power tool system 1100 is illustrated. The power tool system 1100 includes a power tool 1120 and a battery pack 1110. The power tool 1120 may be any of the power tools 120 of FIG. 1. For example, the power tool 1120 may be an impact driver, a hammer drill, or a grinder. Additionally, the power tool 1120 may be other types of power tools and other types of equipment not illustrated or described with respect to FIG. 1. The battery pack 1110 may be any of the battery packs 110 of FIG. 1 and as illustrated in more detail in FIGS. 3A-3E through 10A-10E. Additionally, the battery pack 1110 may be other types of battery packs not illustrated or described with respect to FIG. 1.

Each power tool 1120 includes a tool housing 1104. The tool housing 1104 includes a battery pack receptacle 1106. The battery pack receptacle 1106 is configured to couple with at least one battery pack 1110.

The battery pack receptacle 1106 includes, among other features, a set of tool terminals 1111. The set of tool terminals 1111 provide a point for an electrical interface between the power tool 1120 and the battery pack 1110.

The battery pack 1110 includes a battery pack housing 1112. The battery pack housing 1112 includes a common interface 1113 that operably couples with the battery pack receptacle 1106 on the tool housing 1104. The common interface 1113 includes the common interface 200 of FIG. 2 that is utilized on each of the battery packs 110 of FIG. 1. The battery pack 1110 includes a set of battery cells 1114 that are disposed in the battery pack housing 1112 The battery cells 1114 may be configured in different numbers and different arrangements, as discussed in more detail above with respect to FIGS. 3A-3E through 10A-10E. Different types of battery cells 1114 may be used having different cell characteristics, as discussed in more detail above.

The battery pack 1110 also includes a set of battery pack terminals 1116. The battery pack terminals 1116 may be disposed in the battery pack housing 1112. The set of battery pack terminals 1116 electrically connect to the set of tool terminals 1111 to provide an electrical connection between the battery pack 1110 and the power tool 1120 through the common interface 1113.

The power tool 1120 also includes a motor 1118, which also may be referred to as a load, that is disposed in the tool housing 1104. The motor 1118 includes various motor components (not shown). The motor 1118 includes an output shaft 1121 that is coupled to drive a tool element 1122. The tool element 1122 may vary based on the type of power tool 1120 in the power tool system 1100. For example, the tool element may include a drill bit when the power tool 1120 is a hammer drill. In another example, the tool element 1122 may include a cutting wheel or a grinding wheel when the power tool 1120 is a grinder.

The power tool 1120 includes a tool control module (also referred to as a controller) 1124 that is disposed in the tool housing 1104. The tool control module 1124 is operably connected to the set of tool terminals 1111 and to the motor 1118 to control power delivery to the motor 1118 from the battery pack 1110.

Figure 21:
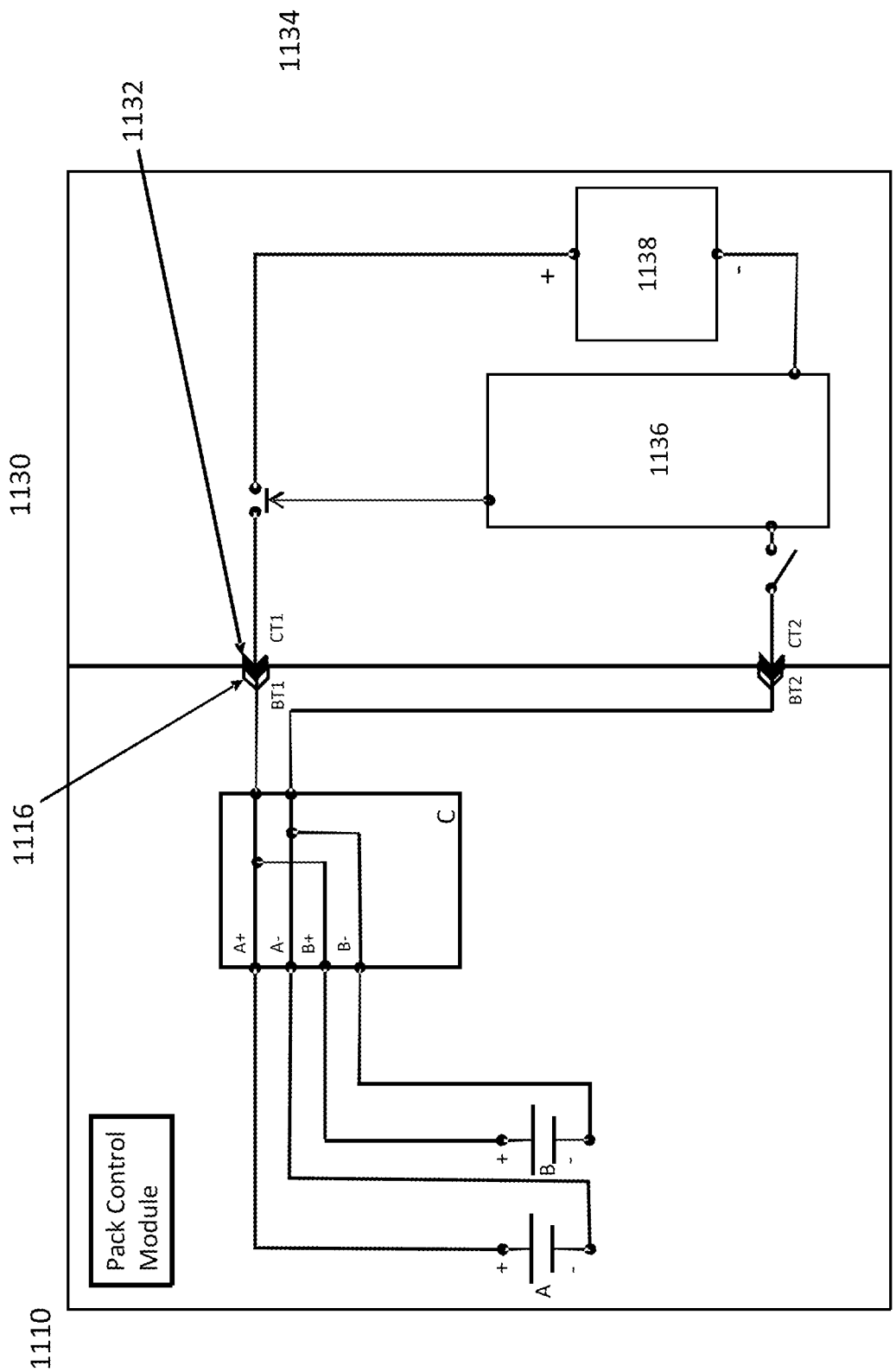
FIG. 21 illustrates a simplified schematic of an example battery pack coupled to an example battery charger.

Referring to FIG. 21, the battery pack 1110 (any of the battery packs 110) may be coupled to a charger 1130 (the charger 130). The charger 1130 also includes a power supply 1138, that is disposed in the charger housing 1134. The charger may also include a charger control module 1136 to control charging of the battery pack 1110.

Referring to FIGS. 12A-12B, an example table summarizes the battery packs 110*a*-110*h* of FIG. 1 and the respective volume information illustrated in FIGS. 3A-10E and described above. Further, the table summarizes the power density, and peak power density values for the battery packs 110*a*-110*h*, as described above. The reference numbers in the first column correspond to the reference number illustrated in FIGS. 1 and 3A-10E. The volume descriptions, volume values, power density values, and peak power density values correspond to the values described above with respect to the battery packs and volume representation of the battery packs illustrated in FIGS. 1 and 3A-10E.

In one general aspect, a power tool system includes a power tool. The power tool includes a tool housing and a load disposed in the tool housing. The tool housing includes a battery pack receptacle and the battery pack receptacle includes a set of tool terminals. The power tool system includes a first battery pack. The first battery pack includes a first battery pack housing operably connectable to the battery pack receptacle on the tool housing through a first battery pack interface disposed on the first battery pack housing, a first set of battery cells disposed in the first battery pack housing, and a first set of battery pack terminals electrically connectable to the set of tool terminals and electrically connected to the first set of battery cells. The power tool system includes a second battery pack. The second battery pack includes a second battery pack housing operably connectable to the battery pack receptacle on the tool housing through a second battery pack interface disposed on the second battery pack housing, a second set of battery cells disposed in the second battery pack housing, and a second set of battery pack terminals electrically connectable to the set of tool terminals and electrically connected to the second set of battery cells. The first battery pack and the second battery pack have a same nominal voltage. The first battery pack interface and the second battery pack interface define a common interface. The first battery pack defines a total volume in a range of approximately 150 $cm^3$ to 860 $cm^3$ and the second battery pack defines a total volume greater than approximately 980 $cm^3$.

Implementations includes one or more of the following features. For example, the second battery pack may define a total volume greater than or equal to approximately 1272 $cm^3$. In some implementations, the first battery pack may define a peak power density in a range of approximately 6.0 Watts/cm$^3$ to 7.8 Watts/cm$^3$. The second battery pack may define a peak power density greater than or equal to approximately 7.8 Watts/cm$^3$.

In some implementations, the first battery pack may define a peak power density greater than or equal to approximately 9.5 Watts/cm$^3$.

In some implementations, the first set of battery cells have a first form factor—sometimes or also referred to as format or configuration or geometric shape—and the second set of battery cells have a second form factor, the first form factor being different than the second form factor.

In some implementations, the first form factor is a pouch form factor and the second form factor is a cylindrical form factor.

In some implementations, the first set of battery cells may include 21700-sized battery cells and the second set of battery cells may include 21700-sized battery cells.

In some implementations, the first set of battery cells may include 18650-sized battery cells and the second set of battery cells may include 18650-sized battery cells.

In some implementations, the first set of battery cells may include 18650-sized battery cells and the second set of battery cells may include 21700-sized battery cells.

In some implementations, the first set of battery cells may include 21700-sized battery cells and the second set of battery cells may include 18650-sized battery cells.

In some implementations, the first set of battery cells may be a first type of battery cells and the second set of battery cells may be a second type of battery cells, the first type of battery cells being different than the second type of battery cells.

In some implementations, the first set of battery cells may be pouch-type battery cells and the second set of battery cells may be cylinder-type battery cells.

In some implementations, the load may include a motor disposed in the tool housing, and the power tool may further include a controller disposed in the tool housing. The motor includes an output shaft that is operably coupled to drive a tool element. The controller is operably connected to the set of tool terminals and to the motor to control power delivery to the motor.

In some implementations, the first battery pack and the second battery pack have the same nominal voltage of approximately 18 V.

In another general aspect, a power tool system includes a power tool. The power tool includes a tool housing and a load disposed in the tool housing. The tool housing includes a battery pack receptacle and the battery pack receptacle including a set of tool terminals. The power tool system includes a first battery pack. The first battery pack includes a first battery pack housing operably connectable to the battery pack receptacle on the tool housing through a first battery pack interface disposed on the first battery pack housing, a first set of battery cells disposed in the first battery pack housing, and a first set of battery pack terminals electrically connectable to the set of tool terminals and electrically connected to the first set of battery cells. The power tool system includes a second battery pack. The second battery pack includes a second battery pack housing operably connectable to the battery pack receptacle on the tool housing through a second battery pack interface disposed on the second battery pack housing, a second set of battery cells disposed in the second battery pack housing, and a second set of battery pack terminals electrically connectable to the set of tool terminals and electrically connected to the second set of battery cells. The first battery pack and the second battery pack have a same nominal voltage. The first battery pack interface and the second battery pack interface define a common interface. The first battery pack defines a peak power density in a range of approximately 6.0 W/cm$^3$ to approximately 7.8 W/cm$^3$ and the second battery pack defines a peak power density greater than or equal approximately 7.8 W/cm$^3$.

Implementations include one or more of the following features. For example, the first battery pack may define a total volume in a range of approximately 150 cm$^3$ to 860 cm$^3$. The second battery pack may define a total volume greater than approximately 980 cm$^3$. The second battery pack may define a total volume greater than approximately 1272 cm$^3$.

In some implementations, the first set of battery cells may have a form factor and the second set of battery cells may have a second form factor, the first form factor being different than the second form factor.

In some implementations, the first form factor is a cylindrical form factor and the second form factor is a pouch form factor.

In some implementations, the first set of battery cells may be a first type of battery cells and the second set of battery cells may be a second type of battery cells, the first type of battery cells being different than the second type of battery cells.

In some implementations, the first set of battery cells are cylindrical-type battery cells and the second set of battery cells are pouch-type battery cells.

In some implementations, the first set of battery cells may include 21700-sized battery cells and the second set of battery cells may include 21700-sized battery cells.

In some implementations, the first set of battery cells may include 18650-sized battery cells and the second set of battery cells may include 18650-sized battery cells.

In some implementations, the first set of battery cells may include 18650-sized battery cells and the second set of battery cells may include 21700-sized battery cells.

In some implementations, the first set of battery cells may include 21700-sized battery cells and the second set of battery cells may include 18650-sized battery cells.

In some implementations, the first set of battery cells may include pouch-type battery cells.

In some implementations, the load may include a motor disposed in the tool housing, and the power tool may further include a controller disposed in the tool housing. The motor includes an output shaft that is operably coupled to drive a tool element. The controller is operably connected to the set of tool terminals and to the motor to control power delivery to the motor.

In some implementations, the first battery pack and the second battery pack have the same nominal voltage of approximately 18 V.

In another general aspect, a power tool system includes a power tool. The power tool includes a tool housing and a load disposed in the tool housing. The tool housing includes a battery pack receptacle. The battery pack receptacle includes a set of tool terminals. The power tool system includes a set of battery packs. Each battery pack in the set of battery packs includes a battery pack housing operably connectable to the battery pack receptacle on the tool housing through a battery pack interface disposed on the battery pack housing, a set of battery cells disposed in the battery pack housing, and a set of battery pack terminals electrically connectable to the set of tool terminals and electrically connected to the set of battery cells. Each battery pack in the set of battery packs has a same nominal voltage.

Each battery pack in the set of battery packs defines a common interface. At least a first subset of the set of battery packs defines a total volume in a range of approximately 150 cm³ to 860 cm³.

Implementations may include one or more of the following features. For example, at least a second subset of the set of battery packs may define a total volume greater than approximately 980 cm³. The first subset of the set of battery packs may define a peak power density in a range of approximately 6.0 W/cm³ to approximately 7.8 W/cm³. The second subset of the set of battery packs may define a peak power density greater than or equal to approximately 7.8 W/cm³.

In some implementations, the load may include a motor disposed in the tool housing, and the power tool may further include a controller disposed in the tool housing. The motor includes an output shaft that is operably coupled to drive a tool element. The controller is operably connected to the set of tool terminals and to the motor to control power delivery to the motor.

In some implementations, the first battery pack and the second battery pack have the same nominal voltage of approximately 18 V.

In one general aspect, a power tool system includes a power tool. The power tool includes a tool housing and a load disposed in the tool housing. The tool housing includes a battery pack receptacle and the battery pack receptacle includes a set of tool terminals. The power tool system includes a first battery pack. The first battery pack includes a first battery pack housing operably connectable to the battery pack receptacle on the tool housing through a first battery pack interface disposed on the first battery pack housing, a first set of battery cells disposed in the first battery pack housing, and a first set of battery pack terminals electrically connectable to the set of tool terminals and electrically connected to the first set of battery cells. The power tool system includes a second battery pack. The second battery pack includes a second battery pack housing operably connectable to the battery pack receptacle on the tool housing through a second battery pack interface disposed on the second battery pack housing, a second set of battery cells disposed in the second battery pack housing, and a second set of battery pack terminals electrically connectable to the set of tool terminals and electrically connected to the second set of battery cells. The first battery pack and the second battery pack have a same nominal voltage. The first battery pack interface and the second battery pack interface define a common interface. The first set of battery cells include a cylindrical format and the second set of battery cells include a pouch format.

As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A power tool system, comprising:
   a power tool, the power tool including
     a tool housing, the tool housing including a battery pack receptacle, the battery pack receptacle including a set of tool terminals, and
     a load disposed in the tool housing; and
   a first battery pack, the first battery pack including
     a first battery pack housing operably connectable to the battery pack receptacle on the tool housing through a first battery pack interface disposed on the first battery pack housing,
     a first set of battery cells disposed in the first battery pack housing, and
     a first set of battery pack terminals electrically connectable to the set of tool terminals and electrically connected to the first set of battery cells, wherein
       the first battery pack defines a peak power density greater than 9.5 W/cm³, and
       the first set of battery cells define a pouch form factor.

2. The power tool system of claim 1, wherein the first battery pack defines a total volume in a range of approximately 150 cm³ to approximately 860 cm³.

3. The power tool system of claim 1, wherein the first battery pack defines a nominal voltage of approximately 18 V.

4. The power tool system of claim 1, further comprising a second battery pack, the second battery pack including
  a second battery pack housing operably connectable to the battery pack receptacle on the tool housing through a second battery pack interface disposed on the second battery pack housing,
  a second set of battery cells disposed in the second battery pack housing, and
  a second set of battery pack terminals electrically connectable to the set of tool terminals and electrically connected to the second set of battery cells, wherein
    the second battery pack defines a peak power density in a range of 6.0 W/cm$^3$ to 7.9 W/cm$^3$, and
    the second set of battery cells define a cylindrical form factor.

5. The power tool system of claim 4, wherein the second battery pack defines a total volume greater than approximately 980 cm$^3$.

6. The power tool system of claim 4, wherein the second battery pack defines a nominal voltage of approximately 18 V.

7. The power tool system of claim 4, wherein the first battery pack and the second battery pack have a same nominal voltage.

8. The power tool system of claim 4, wherein the second battery pack is a multi-voltage battery pack.

9. The power tool system of claim 4, wherein the first battery pack interface and the second battery pack interface define a common interface.

10. The power tool system of claim 9, wherein the tool housing includes an interface to mate with the common interface.

11. The power tool system of claim 9, further comprising a battery charger, the battery charger including a charger housing, the charger housing including (a) a battery pack receptacle, the battery pack receptacle including a set of charger terminals, and (b) an interface configured to mate with the common interface, the battery charger configured to charge the first battery pack and the second battery pack.

12. A power tool system, comprising:
  a power tool, the power tool including
    a tool housing, the tool housing including a battery pack receptacle, the battery pack receptacle including a set of tool terminals, and
    a load disposed in the tool housing; and
  a first battery pack, the first battery pack including
    a first battery pack housing operably connectable to the battery pack receptacle on the tool housing through a first battery pack interface disposed on the first battery pack housing,
    a first set of battery cells disposed in the first battery pack housing, and
    a first set of battery pack terminals electrically connectable to the set of tool terminals and electrically connected to the first set of battery cells, wherein
      the first battery pack defines a peak power density greater than 9.5 W/cm$^3$,
      the first battery pack defines a total volume in a range of approximately 150 cm$^3$ to approximately 860 cm$^3$,
      the first battery pack defines a nominal voltage of approximately 18 V, and
      the first set of battery cells define a pouch form factor.

13. The power tool system of claim 12, further comprising a second battery pack, the second battery pack including
  a second battery pack housing operably connectable to the battery pack receptacle on the tool housing through a second battery pack interface disposed on the second battery pack housing,
  a second set of battery cells disposed in the second battery pack housing, and
  a second set of battery pack terminals electrically connectable to the set of tool terminals and electrically connected to the second set of battery cells, wherein
    the second battery pack defines a peak power density in a range of 6.0 W/cm$^3$ to 7.9 W/cm$^3$, and
    the second set of battery cells define a cylindrical form factor.

14. The power tool system of claim 13, wherein the second battery pack defines a total volume greater than approximately 980 cm$^3$.

15. The power tool system of claim 13, wherein the second battery pack defines a nominal voltage of approximately 18 V.

16. The power tool system of claim 13, wherein the second battery pack is a multi-voltage battery pack.

17. The power tool system of claim 13, wherein the first battery pack interface and the second battery pack interface define a common interface.

18. The power tool system of claim 17, wherein the tool housing includes an interface to mate with the common interface.

19. The power tool system of claim 17, further comprising a battery charger, the battery charger including a charger housing, the charger housing including (a) a battery pack receptacle, the battery pack receptacle including a set of charger terminals, and (b) an interface configured to mate with the common interface, the battery charger configured to charge the first battery pack and the second battery pack.

20. A set of battery packs, comprising:
  a first battery pack, the first battery pack including
    a first battery pack housing operably connectable to a battery pack receptacle on a tool housing through a first battery pack interface disposed on the first battery pack housing,
    a first set of battery cells disposed in the first battery pack housing, and
    a first set of battery pack terminals electrically connectable to a set of tool terminals and electrically connected to the first set of battery cells, wherein
      the first battery pack defines a peak power density greater than 9.5 W/cm$^3$, and
      the first set of battery cells define a pouch form factor.

21. The set of battery packs of claim 20, wherein the first battery pack defines a total volume in a range of approximately 150 cm$^3$ to approximately 860 cm$^3$.

22. The set of battery packs of claim 20, wherein the first battery pack defines a nominal voltage of approximately 18 V.

23. The set of battery packs of claim 20, further comprising a second battery pack, the second battery pack including
  a second battery pack housing operably connectable to the battery pack receptacle on the tool housing through a second battery pack interface disposed on the second battery pack housing,
  a second set of battery cells disposed in the second battery pack housing, and a second set of battery pack terminals electrically connectable to the set of tool terminals and electrically connected to the second set of battery cells, wherein the second battery pack defines a peak power density in a range of 6.0 W/cm$^3$ to 7.9 W/cm$^3$, and the second set of battery cells define a cylindrical form factor.

24. The set of battery packs of claim 23, wherein the second battery pack defines a total volume greater than approximately 980 cm$^3$.

25. The set of battery packs of claim 23, wherein the second battery pack defines a nominal voltage of approximately 18 V.

26. The set of battery packs of claim 23, wherein the first battery pack and the second battery pack have a same nominal voltage.

27. The set of battery packs of claim 23, wherein the second battery pack is a multi-voltage battery pack.

28. The set of battery packs of claim 23, wherein the first battery pack interface and the second battery pack interface define a common interface.

* * * * *